United States Patent
Orozco-Cardenas et al.

(10) Patent No.: US 12,442,013 B2
(45) Date of Patent: Oct. 14, 2025

(54) METHOD FOR PRODUCING PLANTS WITH MINIMIZED BIOMASS BYPRODUCT AND ASSOCIATED PLANTS THEREOF

(71) Applicant: The Regents of the University of California, Oakland, CA (US)

(72) Inventors: Martha Lucia Orozco-Cardenas, Oakland, CA (US); Robert Jinkerson, Oakland, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 17/905,733

(22) PCT Filed: Mar. 5, 2021

(86) PCT No.: PCT/US2021/021194
§ 371 (c)(1),
(2) Date: Sep. 6, 2022

(87) PCT Pub. No.: WO2021/178880
PCT Pub. Date: Sep. 10, 2021

(65) Prior Publication Data
US 2023/0104872 A1    Apr. 6, 2023

Related U.S. Application Data

(60) Provisional application No. 62/985,778, filed on Mar. 5, 2020.

(51) Int. Cl.
*C12N 15/82*     (2006.01)
(52) U.S. Cl.
CPC ..... *C12N 15/8262* (2013.01); *C12N 15/8213* (2013.01)
(58) Field of Classification Search
CPC .. C12N 15/8262; C12N 15/8213; C12N 9/22; C12N 15/8261; C12N 2310/20; C12N 15/113; Y02A 40/146; A01H 5/10; A01H 6/825
See application file for complete search history.

(56) References Cited

U.S. PATENT DOCUMENTS

| | | |
|---|---|---|
| 2009/0013431 A1 | 1/2009 | Van Thournout et al. |
| 2012/0084883 A1 | 4/2012 | Den Boer et al. |
| 2019/0225974 A1* | 7/2019 | D'Halluin ............ C12N 15/111 |

FOREIGN PATENT DOCUMENTS

| | | |
|---|---|---|
| WO | 2019/144124 A1 | 7/2019 |
| WO | 2019/196717 A1 | 10/2019 |

OTHER PUBLICATIONS

Akari, Khalid, et al. "Effect of the PARP Inhibitor 3-Methoxy Benzamide on Shoot Regeneration and Microtuber Formation of the Blue Potato Solanum andigenum." In Vitro Cellular & Developmental Biology—Animal. vol. 49. 233 Spring St, New York, NY 10013 USA: Springer, 2013. (Year: 2013).*
Tomlinson, Laurence, et al. "Using CRISPR/Cas9 genome editing in tomato to create a gibberellin-responsive dominant dwarf DELLA allele." Plant biotechnology journal 17.1 (2019): 132-140. (Year: 2019).*
Njuguna, Elizabeth, et al. "Modulation of energy homeostasis in maize and *Arabidopsis* to develop lines tolerant to drought, genotoxic and oxidative stresses." Afrika Focus 30.2 (2017): 66-76. (Year: 2017).*
Liu, Caifeng, et al. "Poly (ADP-ribose) polymerases regulate cell division and development in *Arabidopsis* roots." Journal of integrative plant biology 59.7 (2017): 459-474. (Year: 2017).*
Akari, et al., "P-2050 Effect of the PARP Inhibitor 3-Methoxy Benzamide on Shoot Regeneration and Microtuber Formation of the Blue Potato *Solanum andigenus*" https://sivb.org/meetings/pastmeetings/2013Meeting/2013Assets/Plant%20posters.pdf, Retrieved on May 28, 2021.
International Search Report and Written Opinion, Application No. PCT/US2021/021194, dated Jul. 19, 2021.
Liu et al., "Poly (ADP-ribose) polymerase regulates cell division and development in *Arabidopsis* roots," J. Int. Plant Biol., Jul. 2017, vol. 59, No. 7, pp. 459-474.
Rissel et al., "Poly(ADP-Ribose) Polymerases in Plants and Their Human Counterparts: Parallels and Peculiarities," Int. J. Mol., Sci., 2019, vol. 20, No. 7, pp. 1-29.
Song et al., "PARP2 is the Predominant Poly(ADP-Ribose) Polymerase in *Arabidopsis* DNA Damage and Immune Responses," PLoS Genet., May 7, 2015, vol. 11, No. 5, pp. 1-24.
International Preliminary Report on Patentability, Application No. PCT/US2021/021194, dated Sep. 15, 2022.
Extended European Search Report, Application No. 21764956.5, dated Apr. 8, 2024.
Pham et al., "Analysis of knockout mutants reveals non-redundant functions of poly(ADP-ribose) polymerase isoforms in *Arabidopsis*," Plant Molecular Biology, 89(4), Oct. 1, 2015, pp. 319-338.

* cited by examiner

*Primary Examiner* — Amjad Abraham
*Assistant Examiner* — Kelsey L Mcwilliams
(74) *Attorney, Agent, or Firm* — Kilpatrick Townsend & Stockton LLP

(57) ABSTRACT

The invention relates to a plant having an increased proportion of edible biomass resulting from genetic modification of gene that encodes a poly(adenosine 5'-diphosphate (ADP)-Ribose) Polymerase (PARP) enzyme.

4 Claims, 23 Drawing Sheets
Specification includes a Sequence Listing.

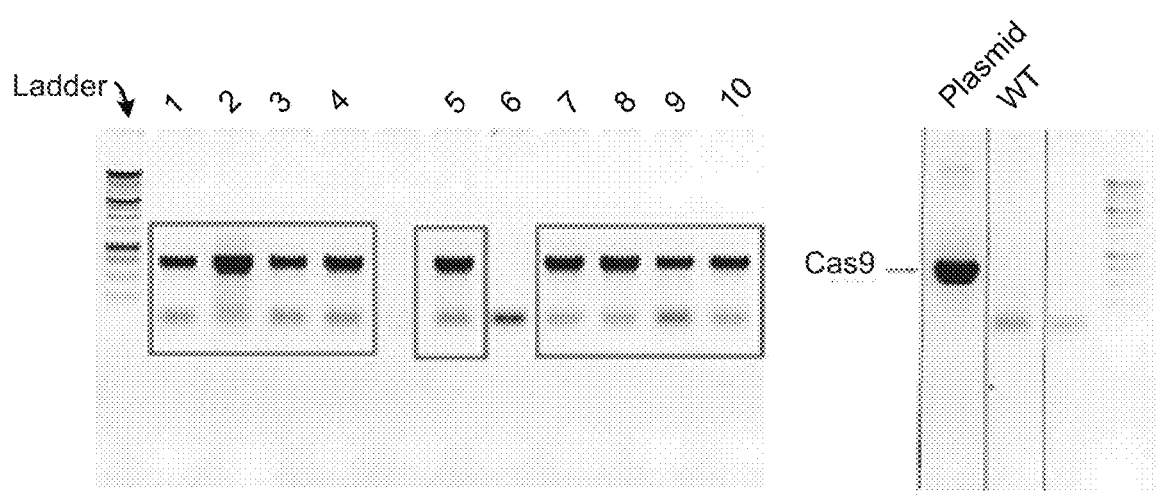
FIG. 5A
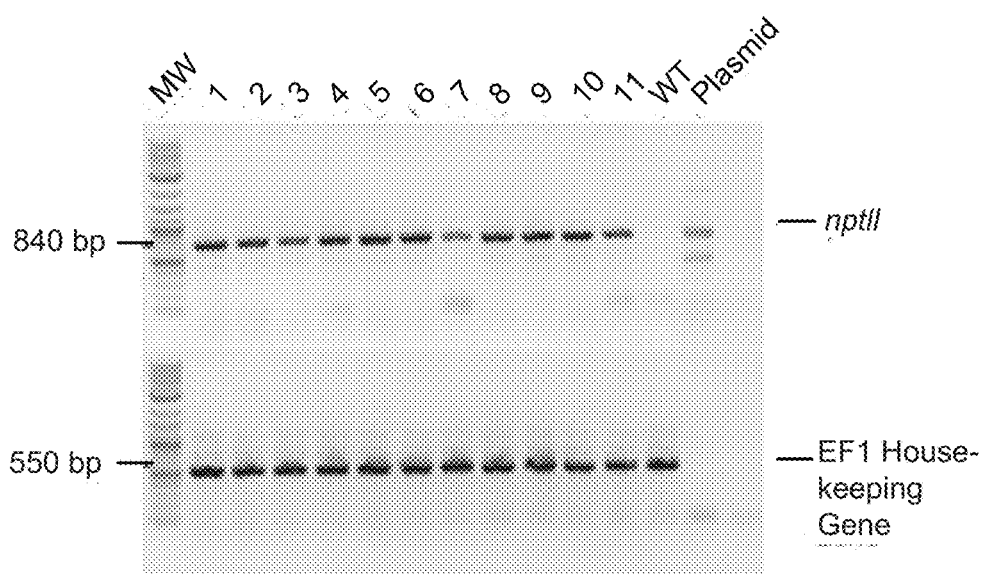
FIG. 5B
| | Yellow highlights = deletions |
|---|---|
| Guide RNA | ATACGTATGCCGGTGATGCC |
| WT | GACAAACGAAGATCAGTGGTCCCTATACGTATGCCGGTGATGCCACATCTGAGTT |
| 1 | GACAAACGAAGATCAGTGGTCCCTA--CGTATGCCGGTGATGCCACATCTGAGTT |
| 4 | GACAAACGAAGATCAGTGGTCCCTATA--GTATGCCGGTGATGCCACATCTGAGTT |
FIG. 5C

FIG. 7

SEQUENCE LISTING

<160> NUMBER OF SEQ ID NOS: 6

<210> SEQ ID NO 1
<211> LENGTH: 1693
<212> TYPE: DNA
<213> ORGANISM: Solanum lycopersicum

<400> SEQUENCE: 1

```
atggccacca ttaccaattt taatgtcgat gaatttgact caatgaatgt tgtggaggag      60
tataagaaga taagtgttaa tgatccggtg aactttata cttggtcgaa gaaaaaattt     120
gttgacaggc tttgtgctgt tgctaattta cagattgacg atcatctacc agttggagat    180
gaaggcaaga cagagaaatt ggtcacagca acaaagaagg gtgcagctgt tttggatcaa    240
tatctgtcag atgaaatcaa ggcattatac catgtcctgc atcaaggaaa tgatatttat    300
gaggccacat tgaaccaaac aaatgttgag aacaacgata acgaattta tatcattcaa    360 gttctagaga atgattgtgg tgggaatttc cttctttaca ctagatgggg tagagttggt    420
gaaaagggag aaacgaagat cagtggtccc tatacgtatg ccggtgatgc cacatctgag    480
tttgagcgta aattctatga aagaccaag aactgttggt ctaaccgcaa agatttttt    540 tgtcaaccaa agcaatatgc ttggttggaa atggactatg atgaaaatgg ggaatactca    600
tcaatccaag acagtccat tctagtacca agaagtcgac ctcgtgagac taagctggag    660
gccccgattg caaagttcat atctcttatt tgtgacatca atatgatgag gcagcaaatg    720
atggaaatag gttacaatgc taacaagttg ccactcggta aattgagcaa gaaaactatt    780
ttaaagggct atgatgtctt gaaaatatt gctgtgttat aggccagttc aacaggacac    840
```

```
tgcttgaaga tttgagcagt caattctata cagtcattcc tcatgatttt ggattccaga        900
agatggaatt tgtcattgac acccttccaa agttaaaacg caaaattgaa atggtgaaag        960
ctcttgctga aattgaagtc acaactaagt tatcggagga taacacagat atacaggagg       1020
atcccttgtt ttatcaatat gaacaacttg gttgcaaact tgttccagtt gaagtcggtt       1080
cccaggaata tctcatgatt gagaattaca tgaagaatac ccatgcaaaa tacattctgg       1140
ttatgctgtc gatattgttc aagtatttag ggcatcaaga atggtgaaa atgaaagatt        1200 tcagaagttc tctgatacga gtaataggat gcttttatgg cacggttctc ggctgacaaa       1260
ctgggctggc attctttcac agggtttaag aattgctcct ccagaagcac cttcgacagg       1320
gtacatgttt gggaaaggtg tttactttgc tgatatgttc tccgagagtg caattattg       1380 ctatgcctca tcggctgcta agaatggtgt gcttttgttg tgcgaggttg ctctcggcga       1440
catgaatgag ctattgtcag ccaactccga tgctgataag ttgcctttgg gaaagctaag       1500
cacaaaagca gtcggtgcca tggccccaga ttttaaagaa gctcaaatac ttgaagatgg       1560
tgtcatcgtt cctctgggaa atccaaagga gcgaccaaaa cagggtaatt tgttgcataa       1620
tgagtacatt gtttacaatg tggaacaatt aaggatgcgc tatgttatcc aggttgagtt       1680
caattatgaa ata                                                         1693

<210> SEQ ID NO 2
<211> LENGTH: 1286
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 2
cgacttgcct tccgcacaat acatcattc ttcttagctt ttttttcttct tcttcgttca        60 tacagttttt ttttgtttat cagcttacat tttcttgaac cgtagctttc gttttcttct       120
ttttaacttt ccattcggag ttttgtatc ttgtttcata gtttgtccca ggattagaat        180
gattaggcat cgaaccttca agaatttgat tgaataaaac atcttcattc ttaagatatg       240
aagataatct tcaaaaggcc cctgggaatc tgaaagaaga gaagcaggcc catttatatg       300
ggaaagaaca atagtatttc ttatataggc ccatttaagt tgaaaacaat cttcaaaagt       360
cccacatcgc ttagataaga aaacgaagct gagtttatat acagctagag tcgaagtagt       420
gattgatacg tatgccggtg atgccttta gagctagaaa tagcaagtta aaataaggct       480
agtccgttat caacttgaaa aagtggcacc gagtcggtgc ttttttttgc aaaattttcc       540
agatcgattt cttcttcctc tgttcttcgg cgttcaattt ctggggtttt ctcttcgttt       600
tctgtaactg aaacctaaaa tttgacctaa aaaaaatctc aaataatatg attcagtggt       660
tttgtacttt tcagttagtt gagttttgca gttccgatga gataaaccaa tattaatcca       720
aactactgca gcctgacaga caaatgagga tgcaaacaat tttaaagttt atctaacgct       780
agctgttttg tttcttctct ctggtgcacc aacgacggcg ttttctcaat cataaagagg       840
cttgttttac ttaaggccaa taatgttgat ggatcgaaag aagagggctt ttaataaacg       900
agcccgttta agctgtaaac gatgtcaaaa acatcccaca tcgttcagtt gaaaatagaa       960
gctctgttta tatattggta gagtcgacta agagattgag aagtcgacct cgtgagacgt      1020
tttagagcta gaaatagcaa gttaaaataa ggctagtccg ttatcaactt gaaaaagtgg      1080
caccgagtcg gtgctttttt ttgcaaaatt ttccagatcg atttcttctt cctctgttct      1140
```

-continued

```
tcggcgttca atttctgggg tttttctcttc gttttctgta actgaaacct aaaatttgac    1200
ctaaaaaaaa tctcaaataa tatgattcag tggttttgta cttttcagtt agttgagttt    1260
tgcagttccg atgagataaa ccaata                                          1286

<210> SEQ ID NO 3
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 3
atacgtatgc cggtgatgcc                                                   20

<210> SEQ ID NO 4
<211> LENGTH: 55
<212> TYPE: DNA
<213> ORGANISM: Solanum lycopersicum

<400> SEQUENCE: 4
gagaaacgaa gatcagtggt ccctatacgt atgccggtga tgccacatct gagtt            55

<210> SEQ ID NO 5
<211> LENGTH: 53
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 5
gagaaacgaa gatcagtggt ccctacgtat gccggtgatg ccacatctga gtt              53

<210> SEQ ID NO 6
<211> LENGTH: 54
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 6
gagaaacgaa gatcagtggt ccctatagta tgccggtgat gccacatctg agtt             54
```

METHOD FOR PRODUCING PLANTS WITH MINIMIZED BIOMASS BYPRODUCT AND ASSOCIATED PLANTS THEREOF

CROSS-REFERENCE TO RELATED APPLICATIONS

This application is a U.S. National Phase Application of PCT/US2021/021194, International Filing Date Mar. 5, 2021, and which claims priority benefit of U.S. Provisional Application No. 62/985,778, filed Mar. 5, 2020, which is incorporated by reference in its entirety for all purposes.

SEQUENCE LISTING

The instant application contains a Sequence Listing which has been submitted electronically in ASCII format and is hereby incorporated by reference in its entirety. Said ASCII copy, created on Apr. 6, 2021, is named 1238807_SL.txt and is 5,416 bytes in size.

BACKGROUND

Commercial urban farming has been on the rise in the US primarily through controlled-environment agriculture in buildings, shipping containers, or unused space. There are many benefits to growing food in urban centers, including reduction of transportation costs, local production of fresh food year-round, and increased food accessibility for urbanites. Often these systems are designed to have plant growth areas stacked vertically in order to decrease footprint size. This also decreases the available height that plants have to grow in, ultimately limiting the size of crops that can be cultivated in these systems.

Plants on extended space expeditions can provide a fresh source of food and nutrients, $CO_2$ uptake capacity, and behavioral health benefits to crewmembers. Similar physical space constraints can also be found in spaceflight applications where dedicated areas for plant cultivation is severely constrained.

In both cases most fruit and vegetable bearing plants are too large and produce too much inedible biomass to be viable in these built environments. As a consequence, many of these systems only produce a limited variety of small, fast growing crops, e.g., green leafy vegetables such as lettuce. Harvest index, a plant productivity metric used to describe the relative distribution of biomass between the edible and inedible components of a crop (Hay, 1995), needs to be maximized. Because plants are not optimized for growth in these built environments, there are many opportunities to develop new plant traits that match these new constraints.

BRIEF SUMMARY

This invention is based, at least in part, on the discovery that disrupting a gene that encodes the enzyme Poly(adenosine 5'-diphosphate (ADP)-Ribose) Polymerase (PARP), e.g., PARP2, in a plant, e.g., can alter its developmental cycle in a way that is ideal for confined and/or controlled growth, e.g., in spaceflight applications or other environments. Such genetically modified plants can have minimal amounts of leaves and/or develop fruit in rapid progression. Further, the plants can have several traits that make them ideal for cultivation in confined, controlled, vertical, heterotrophic, and/or automated, e.g., those implementing robotics for crop management and/or harvest, environments when compared to widltype plants: 1) small size, 2) small amount of non-edible biomass produced, 3) the ability to produce fruit faster, 4) the ability to produce fruit more consistent in weight and/or size across various harvest times throughout each plant's life cycle, 5) the ability to yield the same or close to the same amount of fruit, 6) less utilization of water and/or vertical and/or horizontal space, e.g., due to any of the aforementioned, and/or 7) the ability to produce more seed.

These desirable traits, which are referred to herein as "SPACE", which can stand for "Small Plants for spACe Expeditions" or "Small Plants for Agriculture in Confined Environments" or "Small Plants for Agriculture in Controlled Environments" or "Small Plants for Agriculturally Controlled Environments". Plants of a specific line with these desirable traits are referred to herein as "SPACE", "SPACE Tomatoes", "M #", e.g., "M3", or "PARP2 Mutant". These SPACE traits can be induced by the addition of chemical inhibitors or in some embodiments, by gene disruption. Most other mutations that make plants dwarfs largely keep the proportion of leafy, un-edible material to edible fruit the same. NASA has previously investigated several dwarf tomatoes for cultivation during spaceflight, but none have been this extreme. In addition to being small, the SPACE trait forces the plant quickly through developmental cycles to produce fruit without the necessity to develop the whole plant. This results in profoundly small plants that produce fruit that is a high fraction of their biomass. Introducing the SPACE trait into plants such as tomato, potato, citrus, strawberries, pepper, and blueberries expands the range of fresh produce that can be cultivated in controlled environment agriculture systems. In some embodiments, e.g., in genetically modified tomato, the plants have fewer leaves and flowers, and develop fruit in a faster progression. In some embodiments, the plants additionally produce larger numbers of seed, e.g., a 2- to 3-fold increase, compared to wild type plants.

Thus, provided herein are plants genetically modified to disrupt the PARP2 gene and inhibit expression of the protein.

BRIEF DESCRIPTION OF THE DRAWINGS

FIG. 5A-5C. 5A: T2 detection by PCR of Cas9 transgene in tomato plants disrupted in the PARP2 gene; 5B: T2 RT-PCR analysis of NPTII gene expression in tomato plants disrupted in the PARP2 gene; 5C: T2 genotyping of tomato plants disrupted in the PARP2 gene. FIG. 5C discloses SEQ ID NOS 3-6, respectively, in order of appearance.

FIG. 7. Orthologues of the tomato PARP2 gene present in different plant species.

10B: Perspective top view of T3 population of mature tomato plants disrupted in the PARP2 gene during flowering and fruiting; 10C: Perspective side view of T3 population of mature tomato plants disrupted in the PARP2 gene during flowering and fruiting.

Figure 11A:
Figure 11B:
Figure 11C:
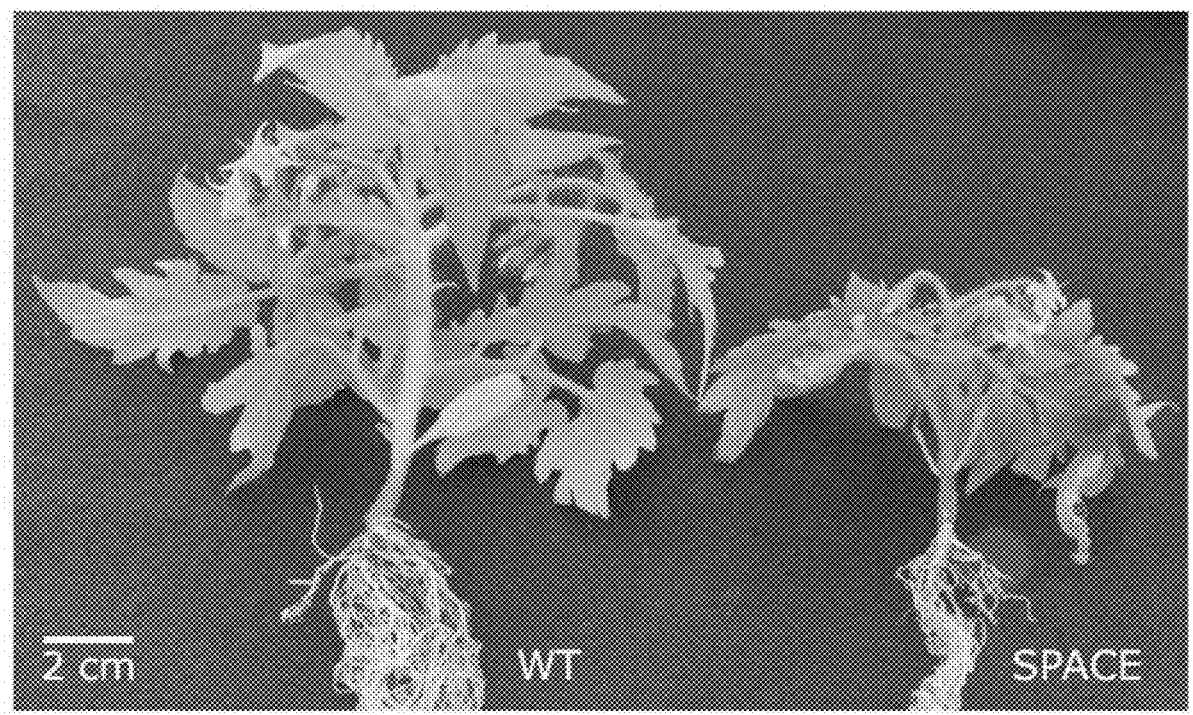

FIG. 11A-11C. 11A: T2 wild type flowering tomato plants; 11B: T2 homozygous tomato plants disrupted in the PARP2 gene showing precocious flowering and fruiting; 11C: tomato plants disrupted in the PARP2 gene showing significantly shorter stem height.

FIG. 12A-12F. 12A: Stem height of mature T3 wild type tomato plants and tomato plants disrupted in the PARP2 gene; 12B: Yield of mature T3 wild type tomato plants and tomato plants disrupted in the PARP2 gene; 12C: Harvest index of mature T3 wild type tomato plants and tomato plants disrupted in the PARP2 gene; 12D: Tomato weight mean of mature T3 wild type tomato plants and tomato plants disrupted in the PARP2 gene; 12E: Tomato weight standard deviation of mature T3 wild type tomato plants and tomato plants disrupted in the PARP2 gene; 12F: Average seeds per fruit of mature T2 wild type tomato plants and tomato plants disrupted in the PARP2 gene.

Figure 13:
Figure 13:
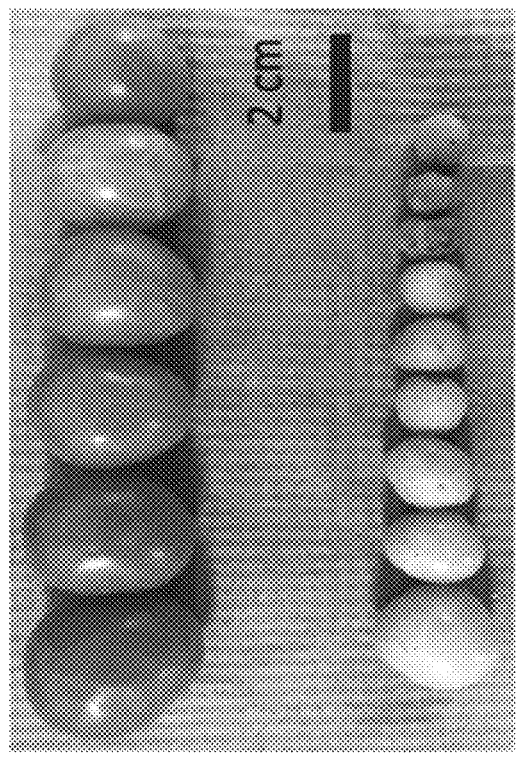

FIG. 13. Tomatoes from T3 wild type tomato plants and tomato plants disrupted in the PARP2 gene.

Figure 14:
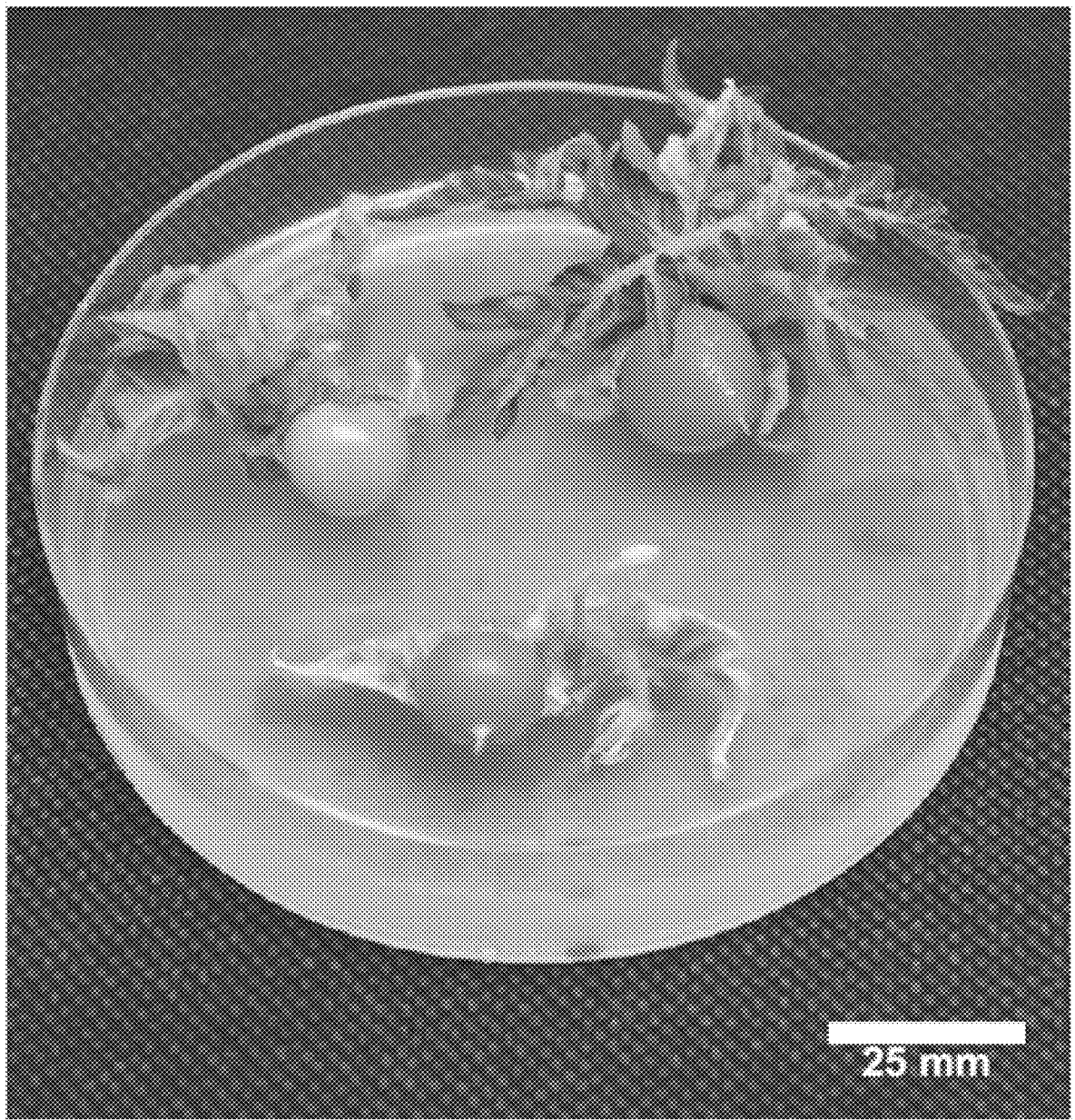

FIG. 14. Latest generation of plants disrupted in the PARP2 gene growing in vitro.

Figure 15:
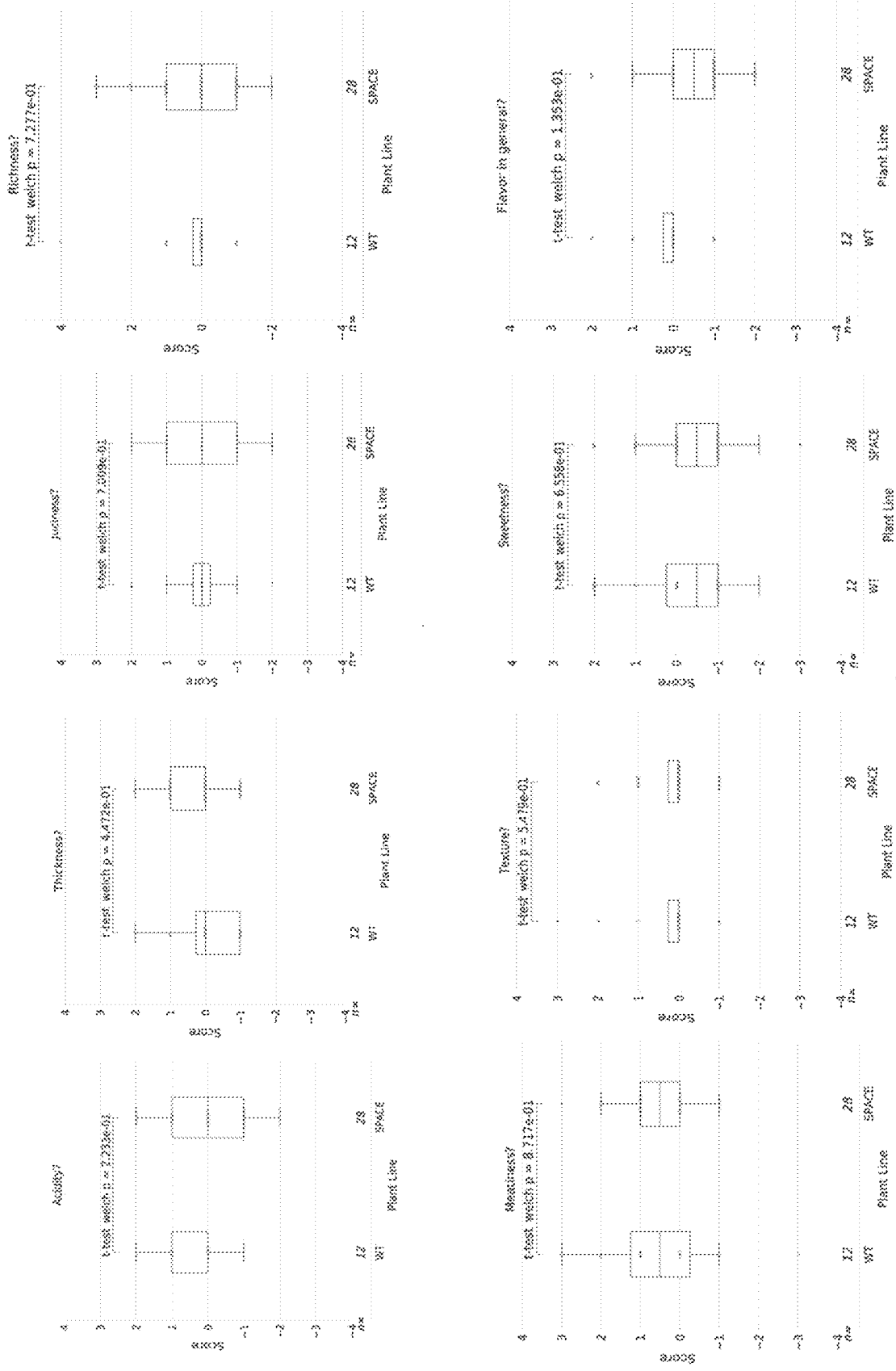

FIG. 15. Taste test of T3 wild type tomato plants and plants disrupted in the PARP2 gene.

Figure 16:
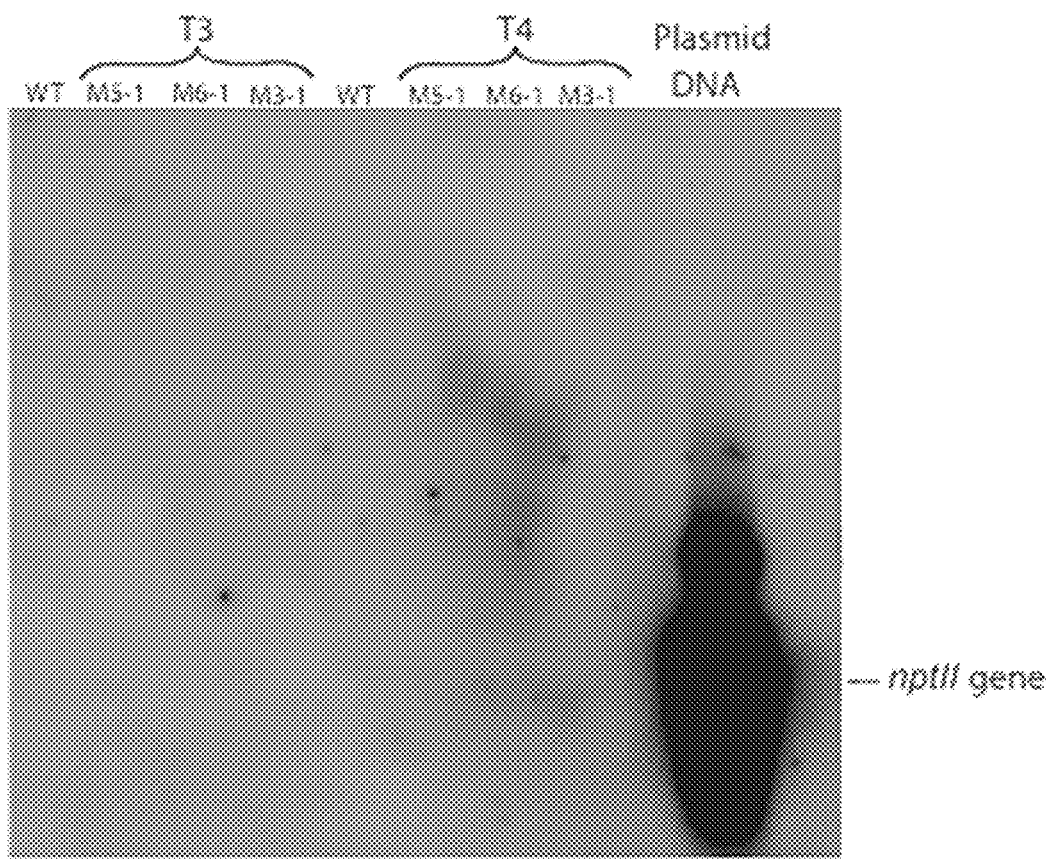

FIG. 16. Southern blot analysis of T3 and T4 wild type tomato plants and plants disrupted in the PARP2 gene.

DETAILED DESCRIPTION

Terminology

Figure 9:
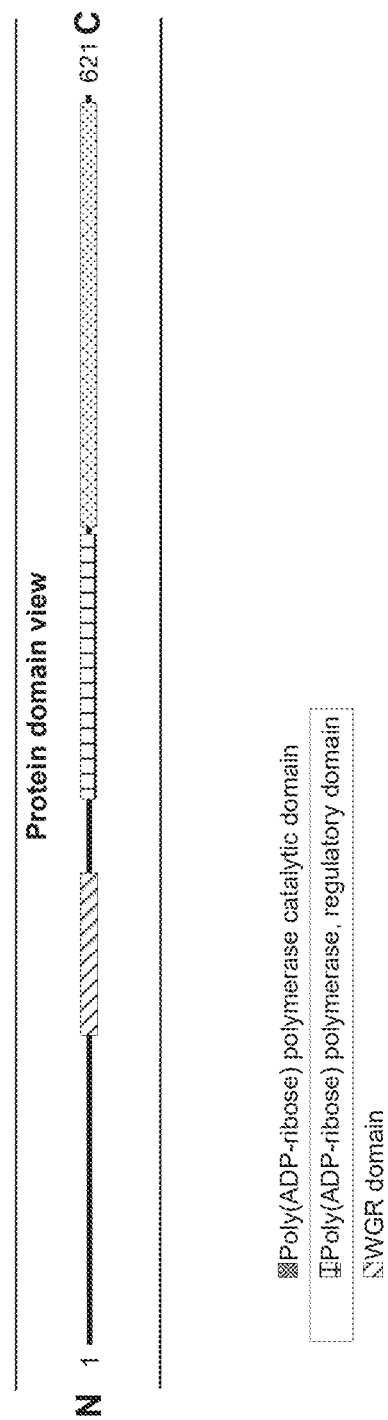
FIG. 9. Structural motifs in tomato PARP2 gene.

As used herein, the term "Poly(adenosine 5'-diphosphate (ADP)-Ribose) Polymerase" or "PARP" gene refers to a gene that encodes a PARP enzyme. Poly(ADP-ribosylation) (PARylation) is an important posttranslational modification that regulates DNA repair, gene transcription, stress responses and developmental processes in plants. Poly (ADP-ribose) polymerase (PARP) catalyzes PARylation by consecutively adding ADP-ribose moieties from NAD+ to the amino acid receptor residues on target proteins. *Arabidopsis* has three canonical PARP members, and two of these members, AtPARP1 and AtPARP2, have been demonstrated to regulate DNA repair and stress response processes. PARP2 makes the greatest contribution to PARP activity in *Arabidopsis*. PARP2-like proteins are broadly conserved across diverse plant taxa, while PARP1 is broadly conserved across plants and animals. Plant PARP2 enzymes typically comprise one or more SAP domains in the N-terminal region that confer DNA binding activity, a WGR domain, a PARP regulatory domains and a PARP catalytic domain, e.g., see Gu et al., *BMC Plant Biol.* 19:364, 2019. *Arabidopsis* PARP1 and PARP2 have a typical H-Y-E catalytic triad in its catalytic core. Endogenous PARP genes in plants, including the PARP2 gene, can be identified based on conserved domains and the presence of a PARP signature motif. PARP has a catalytic domain at the C-terminus of the polypeptide, which is a common characteristic of all PARP protein families. PARP also has a regulatory domain consisting of two helix-loop-helix structural repeats that are typically associated with the C-terminus catalytic domain. The WGR domain is present in a number of PARPs (FIG. 9).

An "endogenous" or "native" gene or protein sequence, as used with reference to an organism, refers to a gene or protein sequence that is naturally occurring in the genome of the organism.

A polynucleotide or polypeptide sequence is "heterologous" to an organism or a second polynucleotide sequence if it originates from a foreign species, or, if from the same species, is modified from its original form. For example, when a promoter is said to be operably linked to a heterologous coding sequence, it means that the coding sequence is derived from one species whereas the promoter sequence is derived from another, different species; or, if both are derived from the same species, the coding sequence is not naturally associated with the promoter (e.g., is a genetically engineered coding sequence, e.g., from a different gene in the same species, or an allele from a different ecotype or variety).

The term "promoter," as used herein, refers to a polynucleotide sequence capable of driving transcription of a coding sequence in a cell. Thus, promoters can include cis-acting transcriptional control elements and regulatory sequences that are involved in regulating or modulating the timing and/or rate of transcription of a gene. For example, a promoter can be a cis-acting transcriptional control element, including an enhancer, a promoter, a transcription terminator, an origin of replication, a chromosomal integration sequence, 5' and 3' untranslated regions, or an intronic sequence, which are involved in transcriptional regulation. These cis-acting sequences typically interact with proteins or other biomolecules to carry out (e.g., turn on/off, regulate, modulate, etc.) gene transcription. A "constitutive promoter" is one that is capable of initiating transcription in nearly all tissue types, whereas a "tissue-specific promoter" initiates transcription only in one or a few particular tissue types.

The term "operably linked" refers to a functional linkage between a nucleic acid expression control sequence (such as a promoter, or array of transcription factor binding sites) and a second nucleic acid sequence, wherein the expression control sequence directs transcription of the nucleic acid corresponding to the second sequence.

The term "plant" includes whole plants, shoot vegetative organs and/or structures (e.g., leaves, stems and tubers), roots, flowers and floral organs (e.g., bracts, sepals, petals, stamens, carpels, anthers), ovules (including egg and central cells), seed (including zygote, embryo, endosperm, and seed coat), fruit (e.g., the mature ovary), seedlings, plant tissue (e.g., vascular tissue, ground tissue, and the like), cells (e.g., guard cells, egg cells, trichomes and the like), and progeny of same. The class of plants that can be used in the method of the invention is generally as broad as the class of higher and lower plants amenable to transformation techniques, including angiosperms (monocotyledonous and dicotyledonous plants), gymnosperms, ferns, and multicellular algae. It includes plants of a variety of ploidy levels, including aneuploid, polyploid, diploid, haploid, and hemizygous. A "genetically modified plant" includes progeny of a plant that have the genetic modification that was engineered into a parent plant.

The phrase "nucleic acid" or "polynucleotide sequence" refers to a single or double-stranded polymer of deoxyribonucleotide or ribonucleotide bases read from the 5' to the 3' end. Nucleic acids may also include modified nucleotides that permit correct read through by a polymerase, and/or formation of double-stranded duplexes, and do not significantly alter expression of a polypeptide encoded by that nucleic acid.

The phrase "nucleic acid sequence encoding" refers to a nucleic acid that encodes an RNA, which in turn may be non-coding (e.g., a gRNA) or a nucleic acid, e.g., an RNA or mRNA, that encodes a specific polypeptide. The nucleic acid sequences include both the DNA strand sequence that is transcribed into RNA and the RNA sequence that is translated into protein. The nucleic acid sequences include both the full length nucleic acid sequences as well as non-full length sequences derived from the full length sequences. It should be further understood that the sequence includes the degenerate codons of the native sequence or sequences which may be introduced to provide codon preference in a specific host cell.

The terms "identical" or percent "identity," in the context of two or more nucleic acids or polypeptide sequences, refer to two or more sequences or subsequences that are the same or have a specified percentage of nucleotides or amino acid residues that are the same, when compared and aligned for maximum correspondence over a comparison window, as measured using one of the following sequence comparison algorithms or by manual alignment and visual inspection. Two nucleic acid sequences or polypeptides are said to be "identical" if the sequence of nucleotides or amino acid residues, respectively, in the two sequences is the same when aligned for maximum correspondence as described below. When percentage of sequence identity is used in reference to proteins or peptides, it is recognized that residue positions that are not identical often differ by conservative amino acid substitutions, where amino acids residues are substituted for other amino acid residues with similar chemical properties (e.g., charge or hydrophobicity) and therefore do not change the functional properties of the molecule. Where sequences differ in conservative substitutions, the percent sequence identity may be adjusted upwards to correct for the conservative nature of the substitution. Means for making this adjustment are well known to those of skill in the art. Typically this involves scoring a conservative substitution as a partial rather than a full mismatch, thereby increasing the percentage sequence identity. Thus, for example, where an identical amino acid is given a score of 1 and a non-conservative substitution is given a score of zero, a conservative substitution is given a score between zero and 1. The scoring of conservative substitutions is calculated according to, e.g., the algorithm of Meyers & Miller, *Computer Applic. Biol. Sci.* 4:11-17 (1988) e.g., as implemented in the program PC/GENE (Intelligenetics, Mountain View, California, USA).

An "expression cassette" refers to a nucleic acid construct that, when introduced into a host cell, results in transcription and/or translation of an RNA or polypeptide, respectively.

An "RNA-guided nuclease" refers to a nuclease, which in combination with a sgRNA, targets a DNA sequence for cleavage. Generally, absent the sgRNA, the nuclease is inactive and does not cleave the DNA at the targeted site. Examples of such nucleases include for example Cas9 and other nucleases as discussed in the context of CRISPR herein.

Genome Editing

Modification of an endogenous plant PARP gene, e.g., a PARP2 gene, to inhibit expression of the gene can be performed using any number of genome editing techniques to modify, delete, or insert nucleic acid sequences into genomic DNA. Examples of such methods include the use of sequence specific-nucleases. In some embodiments, methods of genome editing may employ single-stranded oligonucleotides to introduce precise base-pair modifications in a plant genome, as described by Sauer et al., *Plant Physiol.* 170: 917-1928, 2016.

In some embodiments, a nuclease system for gene editing is used. Any nuclease that can be targeted to a particular genome sequence to induce sequence-specific cleavage and thus allow for targeted mutagenesis can be used. In the present invention, a "guided nuclease" refers to a DNA nuclease that is targeted to a particular genomic DNA sequence, for example by a separate small guide RNAs (sgRNA) or a fused protein sequence that targets the DNA sequence. Any method of delivery can be used to deliver the nuclease and guide molecules. In some embodiments, the nuclease and a guide RNA are delivered by the same mechanism. In some embodiments, the nuclease is delivered to the plant by one mechanism and the sgRNA is delivered to the plant by a second mechanism.

Exemplary nucleases include, for example, engineered or native meganucleases, TALE endonucleases (TALENs), zinc-finger proteins (ZFPs), zinc-finger nucleases (ZFNs), DNA-guided polypeptides such as *Natronobacterium gregoryi* Argonaute (NgAgo), and RNA-guided endonucleases, e.g., for example, a Clustered Regularly Interspersed Short Palindromic Repeat (CRISPR)/Cas9 system, a CRISPR/Cpf1 system, a CRISPR/CasX system, a CRISPR/CasY system, a CRISPR/Cascade system). Other CRISPR/Cas RNA-guided polypeptides Cms1, MAD7, and the like.

The CRISPR/Cas system has been modified for use in prokaryotic and eukaryotic systems for genome editing and transcriptional regulation. The "CRISPR/Cas" system refers to a widespread class of bacterial systems for defense against foreign nucleic acid. CRISPR/Cas systems are found in a wide range of eubacteria and archaeal organisms. CRISPR/Cas systems include type I, II, and III sub-types. Wild-type H CRISPR/Cas systems utilize the RNA-mediated nuclease, Cas9 in complex with guide and activating RNA to recognize and cleave foreign nucleic acid. Cas9 homologs are found in a wide variety of eubacteria, including, but not limited to bacteria of the following taxonomic groups: *Actinobacteria, Aquificae, Bacteroidetes-Chlorobi, Chlamydiae-Verrucomicrobia, Chlroflexi, Cvanobacteria, Firmicutes, Proteobacteria, Spirochaetes*, and *Thermotogae*. An exemplary Cas9 protein is the *Streptococcus pyogenes* Cas9 protein. Additional non-limiting examples of Cas9 proteins and homologs thereof have been described in literature. In some embodiments, the RNA-guided nuclease is a Cpf1 nuclease or a Cas9 nuclease. As noted, in this system the nuclease creates double stranded breaks at the target region programmed by the sgRNA, which results in repair that can lead to inhibitory mutations to disrupt expression of a PARP gene, e.g., a PARP2 gene. In some embodiments, promoter mutations may be introduced into a plant, e.g., using a CRISPR/Cas nuclease system, to disrupt expression of a PARP gene, e.g., a PARP2 gene by mutating the promoter.

In one aspect, provided herein is an engineered, non-naturally occurring Clustered Regularly Interspaced Short Palindromic Repeats (CRISPR)-CRISPR associated (Cas) (CRISPR-Cas) system as well as a guide nucleic acid, e.g., RNA, to introduce one or more alterations that inhibit a PARP gene, e.g., a PARP2 gene. In some embodiments, the CRISPR-Cas system comprises one or more vectors comprising: (a) a first regulatory element operable in a plant cell operably linked to at least one nucleotide sequence encoding a CRISPR-Cas system guide RNA that hybridizes with the target sequence, e.g., the target PARP2 gene sequence, and (b) a second regulatory element operable in a plant cell operably linked to a nucleotide sequence encoding a Type-II Cas9 or Cpf1 protein, wherein components (a) and (b) are located on the same or different vectors of the system, whereby the guide RNAs target the PARP gene sequence and the Cas9 protein cleaves the DNA molecule.

A guide nucleic acid, e.g., one or more sgRNA, that guides the nuclease to a target PARP genome sequence can be expressed in the plant. Guide RNA sequence selection can be performed, e.g., as described in PCT Publication No. WO2018107028.

In some embodiments, the target sequence in the gene of interest may be complementary to the guide region of the sgRNA. In some embodiments, the degree of complementarity or identity between a guide region of a sgRNA and its corresponding target sequence in the gene of interest may be about 50%, 55%, 60%, 65%, 70%, 75%, 80%, 85%, 90%, 95%, 96%, 97%, 98%, 99%, or 100%, with higher or 100% identity being most desirable to avoid off-target effects. In some embodiments, the guide region of a sgRNA and the target region of a gene of interest may be 100% complementary or identical. In other embodiments, the guide region of a sgRNA and the target region of a gene of interest may contain at least one mismatch. For example, the guide region of a sgRNA and the target sequence of a gene of interest may contain 1, 2, 3, 4, 5, 6, 7, 8, 9, or 10 mismatches, where the total length of the target sequence is at least about 17, 18, 19, 20 or more base pairs. In some embodiments, the guide region of a sgRNA and the target region of a gene of interest may contain 1-6 mismatches where the guide sequence comprises at least about 17, 18, 19, 20 or more nucleotides. In some embodiments, the guide region of a sgRNA and the target region of a gene of interest may contain 1, 2, 3, 4, 5, or 6 mismatches where the guide sequence comprises about 20 nucleotides. The 5' terminus may comprise nucleotides that are not considered guide regions (i.e., do not function to direct a Cas9 or another nuclease protein to a target nucleic acid (e.g., gene of interest).

As indicated above, alternatives to CRISPR-based nucleases also can be used. Examples of ZFNs, TALEs, and TALENs are described in, e.g., Lloyd et al., *Frontiers in Immunology*, 4(221), 1-7 (2013).

In some embodiments, the DNA-targeting molecule comprises one or more zinc-finger proteins (ZFPs) or domains thereof that bind to DNA in a sequence-specific manner and that are fused to a nuclease. A ZFP or domain thereof is a protein or domain within a larger protein that binds DNA in a sequence-specific manner through one or more zinc fingers, regions of amino acid sequence within the binding domain whose structure is stabilized through coordination of a zinc ion. The term "zinc finger DNA binding protein" is often abbreviated as zinc finger protein or ZFP.

Among the ZFPs are artificial ZFP domains targeting specific DNA sequences, typically 9-18 nucleotides long, generated by assembly of individual fingers. ZFPs include those in which a single finger domain is approximately 30 amino acids in length and contains an alpha helix containing two invariant histidine residues coordinated through zinc with two cysteines of a single beta turn, and having two, three, four, five, or six fingers. Generally, sequence-specificity of a ZFP may be altered by making amino acid substitutions at the four helix positions (−1, 2, 3 and 6) on a zinc finger recognition helix. Thus, in some embodiments, the ZFP or ZFP-containing molecule is non-naturally occurring, e.g., is engineered to bind to a target site of choice. See, for example, Beerli et al. (2002) *Nature Biotechnol.* 20:135-141; Pabo et al. (2001) *Ann. Rev. Biochem.* 70:313-340; Isalan et al. (2001) *Nature Biotechnol.* 19:656-660; Segal et al. (2001) *Curr. Opin. Biotechnol.* 12:632-637; Choo et al. (2000) *Curr. Opin. Struct. Biol.* 10:411-416; U.S. Pat. Nos. 6,453,242; 6,534,261; 6,599,692; 6,503,717; 6,689,558; 7,030,215; 6,794,136; 7,067,317; 7,262,054; 7,070,934; 7,361,635; 7,253,273; and U.S. Patent Publication Nos. 2005/0064474; 2007/0218528; 2005/0267061, all incorporated herein by reference in their entireties.

In some embodiments, the DNA-targeting molecule is or comprises a zinc-finger DNA binding domain, TALEN, or other DNA-targeting protein fused to a DNA cleavage domain to form a targeted nuclease. In some embodiments, fusion proteins comprise the cleavage domain (or cleavage half-domain) from at least one Type IIS restriction enzyme and one or more DNA-targeting protein. In some embodiments, the cleavage domain is from the Type IIS restriction endonuclease Fok I. Fok I generally catalyzes double-stranded cleavage of DNA, at 9 nucleotides from its recognition site on one strand and 13 nucleotides from its recognition site on the other. See, for example, U.S. Pat. Nos. 5,356,802; 5,436,150 and 5,487,994; as well as Li et al. (1992) *Proc. Natl. Acad. Sci. USA* 89:4275-4279; Li et al. (1993) *Proc. Natl. Acad. Sci. USA* 90:2764-2768; Kim et al. (1994) *Proc. Natl. Acad. Sci. USA* 91:883-887; Kim et al. (1994) *J. Biol. Chem.* 269:31,978-31,982.

In some embodiments, the endonuclease is selected from a meganuclease, a zinc-finger nuclease (ZFN), a transcription activator-like effector nucleases (TALEN), an Argonaute (non-limiting examples of Argonaute proteins include *Thermus thermophilics* Argonaute (TtAgo), *Pyrococcus furiosus* Argonaute (PfAgo), *Natronobacterium gregoryi* Argonaute (NgAgo)), an RNA-guided nuclease, such as a CRISPR associated nuclease (non-limiting examples of CRISPR associated nucleases include Cas1, Cas1B, Cas2, Cas3, Cas4, Cas5, Cas6, Cas7, Cas8, Cas9 (also known as Csn1 and Csx12), Cas10, Csy1, Csy2, Csy3, Cse1, Cse2, Csc1, Csc2, Csa5, Csn2, Csm2, Csm3, Csm4, Csm5, Csm6, Cmr1, Cmr3, Cmr4, Cmr5, Cmr6, Csb1, Csb2, Csb3, Csx17, Csx14, Csx10, Csx16, CsaX, Csx3, Csx1, Csx15, Csf1, Csf2, Csf3, Csf4, Cpf1, CasX, CasY, Mad7, homologs thereof, or modified versions thereof).

Introduction of the nuclease and, in the case of CRISPR-based methods or other methods requiring a separate guide molecule, introduction of the nuclease and separate guide molecule, can be achieved in any number of ways as desired. In some embodiments, the nuclease, the guide molecule, or both are introduced in the plant via a transient method that does not result in introduction of coding sequences for the nuclease or guide nucleic acids into the plant genome. In some embodiments, the nuclease and guide molecule are introduced by the same mechanism. For example, a CRISPR nuclease and an sgRNA can be introduced into the plant in the form of a ribonucleoprotein complex or encoded by DNA or RNA introduced into the plant, wherein the nuclease and optionally the sgRNA are expressed from the introduced DNA or RNA. Alternatively, in some embodiments, an expression cassette encoding the nuclease can be introduced into the genome of the plant and a separate guide molecule, if needed by the nuclease used, can be introduced transiently. A number of methods for introducing nucleases and guide molecules are described in for example, Cermak, T., et al., *The Plant Cell*, Vol. 29: 1196-1217 (June 2017).

In some embodiments, the nuclease and optionally the guide molecule, can be expressed from a constitutive or substantially ubiquitous promoter. For example, a promoter or promoter fragment can be employed to direct expression of the nuclease in all or substantially all (e.g., in many tissues and including shoot meristem) tissues of a plant.

Such promoters are referred to herein as "constitutive" promoters and are active under most environmental conditions and states of development or cell differentiation. Examples of constitutive promoters include the cauliflower mosaic virus (CaMV) 35S transcription initiation region, the 1'- or 2'-promoter derived from T-DNA of *Agrobacterium tumafaciens*, the parsley UBI promoter (Kawalleck et al., *Plant Mol Biol*. (1993 February) 21(4):673-84), RPS5 (Hiroki Tsutsui et al. Plant and Cell Physiology (2016)); 2X35SΩ (Belhaj, Khaoula, et al. *Plant methods* 9.1 (2013): 39); AtUBI10 (Callis J, et al. Genetics 139: 921-939 (1995)); S1UBI10 (Dahan-Meir, Tal, et al. *The Plant Journal* (2018)); G10-90 (Ishige, Fumiharu, et al. *The Plant Journal* 18.4 (1999): 443-448) and other transcription initiation regions from various plant genes known to those of skill.

As used herein, the phrase "modifying" in the context of modifying a genome of a plant refers to inducing a structural change in the sequence of the genome at a target genomic region. For example, the modifying can take the form of deleting a nucleotide sequence from the genome of the cell. Such modifying can be performed, for example, by inducing a double-stranded break within a target genomic region, or a pair of single stranded nicks on opposite strands and flanking the target genomic region.

The resulting DNA breakpoint can be repaired by the cell's DNA repair mechanism (e.g., via non-homologous end joining), which will frequently introduce one or more insertions or deletions at the breakpoint, thereby harming or eliminating activity of encoded proteins or RNAs. In some embodiments, a nucleic acid template molecule can be introduced into the cell (on the same or a separate vector as the guide RNA) such that the nucleic acid template molecule is used by the cell as a homologous template for DNA repair via homology-directed repair (HDR). If the nucleic acid template molecule is homologous but contains one or more nucleotide changes from the cell's chromosomal DNA, the repair will introduce those nucleotide changes as part of the repair, thereby introducing specific targeted changes to the target DNA.

An expression cassette for expression of the nuclease, the guide molecule, or both can be part of a viral replicon or non-viral vector that is introduced into the plant. Any vector with or without a viral replicon can be used. Exemplary plant viral replicon vectors include parts from, e.g., DNA viruses (such as Bean yellow dwarf virus, Wheat dwarf virus, Cabbage leaf curl virus, and Potato Virus X (PVX)) and RNA viruses (such as Tobacco rattle virus). See, e.g., Zaidi et al., Front Plant Sci. 2017; 8: 539 (2017) and Lacomme et al., *Curr Protoc Microbiol*. 2008 February; Chapter 16:Unit 16I.

Any additional methods of delivery of the guide molecules to the plant is contemplated. For example, instead of the use of viral replicon vectors, one can directly deliver nuclease and RNA complexes as RiboNucleoProteins (RNPs). In another embodiment, one can use particle gun bombardment to introduce the guide molecule, the nuclease, or both, or nucleic acids encoding the nuclease and/or guide molecule directly to the plant.

Alternatively, a DNA construct may be combined with suitable T-DNA flanking regions and introduced into a conventional *Agrobacterium tumefaciens* host vector. The virulence functions of the *Agrobacterium tumefaciens* host will direct the transfer of the T-DNA into plant cells when the cell is infected by the bacteria. *Agrobacterium tumefaciens*-mediated transformation techniques, including disarming and use of binary vectors, are well described in the scientific literature. See, for example, Horsch et al. *Science* 233:496-498 (1984), and Fraley et al. *Proc. Natl. Acad. Sci. USA* 80:4803 (1983).

Microinjection techniques can also be used. These techniques are well known in the art and thoroughly described in the literature. The introduction of DNA constructs using polyethylene glycol precipitation is described for example in Paszkowski et al. *EMBO J*. 3:2717-2722 (1984). Electroporation techniques are described for example in Fromm et al. *Proc. Natl. Acad. Sci. USA* 82:5824 (1985). Ballistic transformation techniques are described for example in Klein et al. *Nature* 327:70-73 (1987). In some embodiments, silicon carbide whisker-mediated plant transformation is employed (see, e.g., Asad and Arshad (2011). Silicon Carbide Whisker-mediated Plant Transformation, Properties and Applications of Silicon Carbide, Prof. Rosario Gerhardt (Ed.), ISBN: 978-953-307-201-2).

Plants comprising genetic modifications designed to disrupt or otherwise inhibit expression of a PARP gene can be screened using known techniques. In some embodiments, the presence of a modified gene can be detected. In some embodiments, screening may be performed based on a phenotypic change, for example, a plant can be selected for small size, e.g., smaller in size when compared to a control wildtype plant; for a reduction in the amount of non-edible biomass compared to edible biomass when compared to a control wildtype plant, e.g., selecting based on the following criteria: each plant being able to produce harvestable fruit faster; for tomato, having a harvest index within 0.60 to 0.84 or higher; for tomato, fruit yield greater or equal to 28 grams; for tomato, fruit with an average weight greater than or equal to 3.79 grams and more consistent in size; for tomato, a yield greater than or equal to 39 grams; and/or a stem height less than or equal to 6 centimeters. A "control wild-type plant" refers to a counterpart of the PARP-disrupted plant of the same strain or cultivar as the modified plant, but without the PARP disruption.

In some embodiments, a plant that has a modification to disrupt or otherwise inhibit expression of a PARP gene, e.g., a PARP2 gene, may be smaller than a control wild plant, for example have a size that is 75% of the size or smaller compared to the size of the control wild-type plant, or in some embodiments, 70% of the size or smaller, or 65% of the size or smaller, or 60% of the size or smaller or 55% of the size or smaller, or 50% of the size or smaller compared to the size of the control wild type plant when measured at the same time point, for example during the optimal growth period for the control plant. In some embodiments, a plant that has a modification to disrupt or otherwise inhibit expression of a PARP gene, e.g., a PARP2 gene, may have a harvest index that is 20% or greater than a control wild type plant.

Types of Plants

Figure 7:
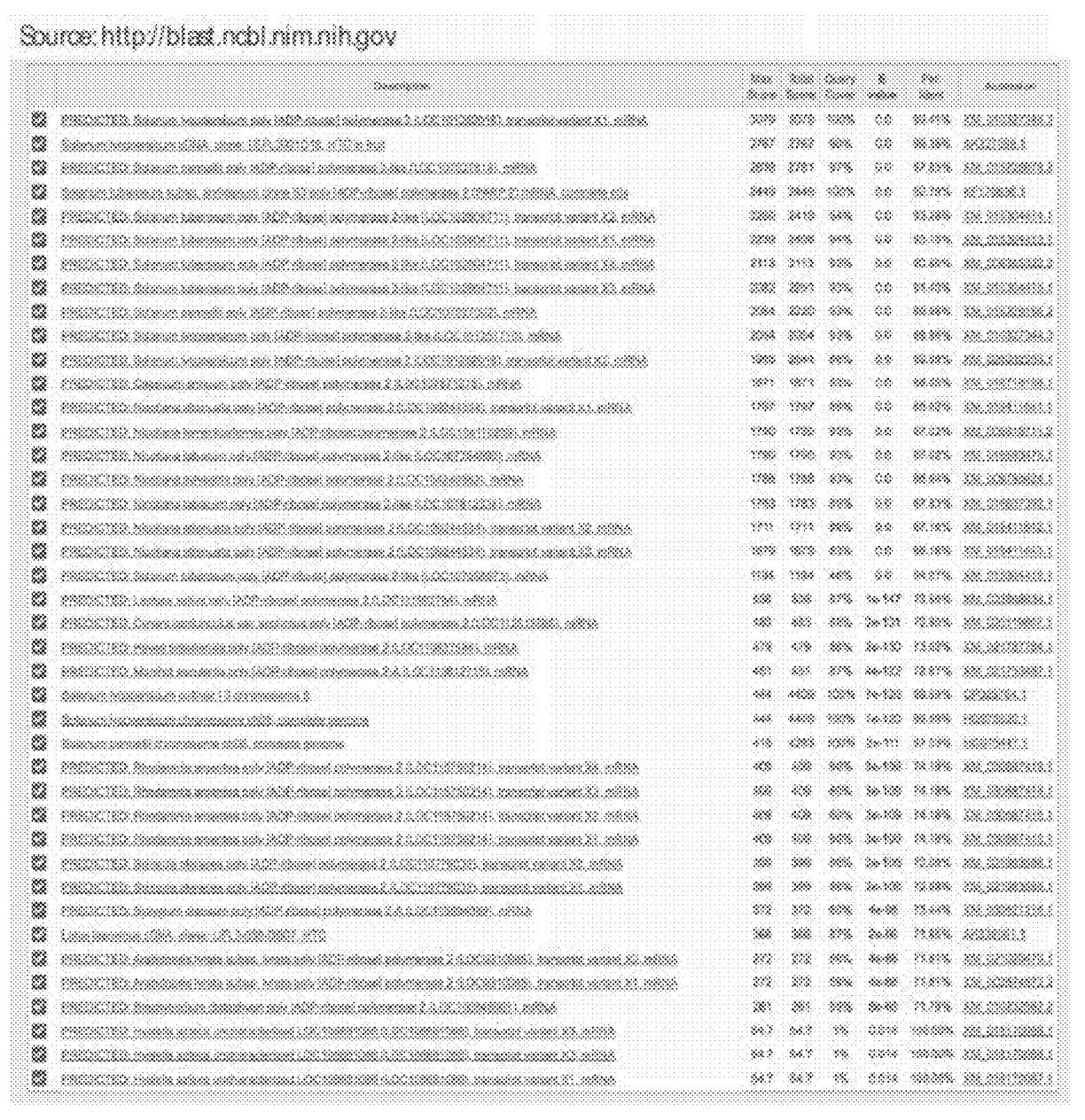

Any plant species can be targeted to disrupt a PARP gene. FIG. 7 provides a summary of accession number for various PARP2 orthologs. In some embodiments, the plant produces fruits or vegetables. In some embodiments, the plant is tomato, canola, beets, potato, citrus, strawberry, pepper, blueberry, rice, wheat, or barley.

In some embodiments, the plant that is genetically modified to disrupt a PARP gene may have additional mutations, such as mutations in a dwarf (d) gene or self-pruning (sp) gene. For example, a plant modified to disrupt a PARP gene, e.g., a tomato plant, may also have d and/or sp gene mutations, which are known (see, e.g., Kobayashi, et al.,

*Plant & Cell Physiology* 55: 445-54, 2014), or other dwarfing genes or genes involved in vegetative growth. In some embodiments, the plant, e.g., a tomato plant, may have a mutation in a SIGLK2 gene (see, e.g., Powell et al., *Science* 336:1711-1715, 2012). Illustrative Dwarf 1 gene in other plants include rice (Ashikari et al, *Proc. Natl. Acad. Sci USA* 96:10284-10289, 1999), barley (Xu et al., *BMC Plant Biology* 17:2-10, 2017); and canola (Muangprom and Osborn, *Theor Appl Genet* 108:1378-1384, 2004).

In some embodiments, the plant is a species of plant of the genus *Abelmoschus, Allium, Apium, Amaranthus, Arachis, Arabidopsis, Asparagus, Atropa, Avena, Benincasa, Beta, Brassica, Cannabis, Capsella, Cica, Cichorium, Citrus, Citrullus, Capsicum, Carthamus, Cocos, Coffea, Cucumis, Cucurbita, Cynasa, Daucus, Diplotaxis, Dioscorea, Elais, Eruca, Foeniculum, Fragaria, Glycine, Gossypium, Helianthus, Heterocallis, Hordeum, Hyoscyamus, Ipomea, Lactuca, Lagenaria, Lepidium, Linum, Lolium, Luffa, Luzula, Lycopersicon, Malus, Manihot, Majorana, Medicago, Momodica, Musa, Nicotiana, Olea, Oryza, Panicum, Pastinaca, Pennisetum, Persea, Petroselinium, Phaseolus, Physalis, Pinus, Pisum, Populus, Pyrus, Prunus, Raphanus, Saccharum, Secale, Senecio, Sesamum, Sinapis, Solanum, Sorghum, Spinacia, Theobroma, Trichosantes, Trigonella, Triticum, Turritis, Valerianelle, Vitis, Vigna,* or *Zea*. In some embodiments, the plant is selected from the species: *Brassica napus, Cucumis melo, Cucurbita pepo, Daucus carota, Gossypium hirsutum, Glycine max, Helianthus annuus, Linum usitatissimum, Papaver somniferum, Phaseolus vulgaris, Solanum lycopersicum, Spinacia oleracea,* or *Vigna unguiculata*.

EXAMPLES

Example 1

Figure 1:
FIG. 1. T1 generation, i.e., first generation after transformation, of mature tomato plants 90 days of age disrupted in the PARP2 gene growing in soil.

Increased Developmental Rate and Harvest Index of CRISPR-Engineered Tomato Plants This example employs CRISPR/Cas9 gene editing to inactivate a key gene in plant growth and stress response that encodes the enzyme Poly(adenosine 5'-diphosphate (ADP)-Ribose) Polymerase (PARP) (Akhari, 2013). This example illustrates that plants, e.g., tomato plants, carrying-over a mutation in the PARP2 gene can rapidly progressed through their developmental cycle to produce fruit. The rapid progress can results in little production of non-fruit biomass. These plants can also produce more seeds and exhibit a higher harvest index than control wild type plants. The phenotype of plants impaired in this gene, e.g., FIG. 1, can be useful for crops grown in the built environment, for example, SPACE plants.

Figure 8:
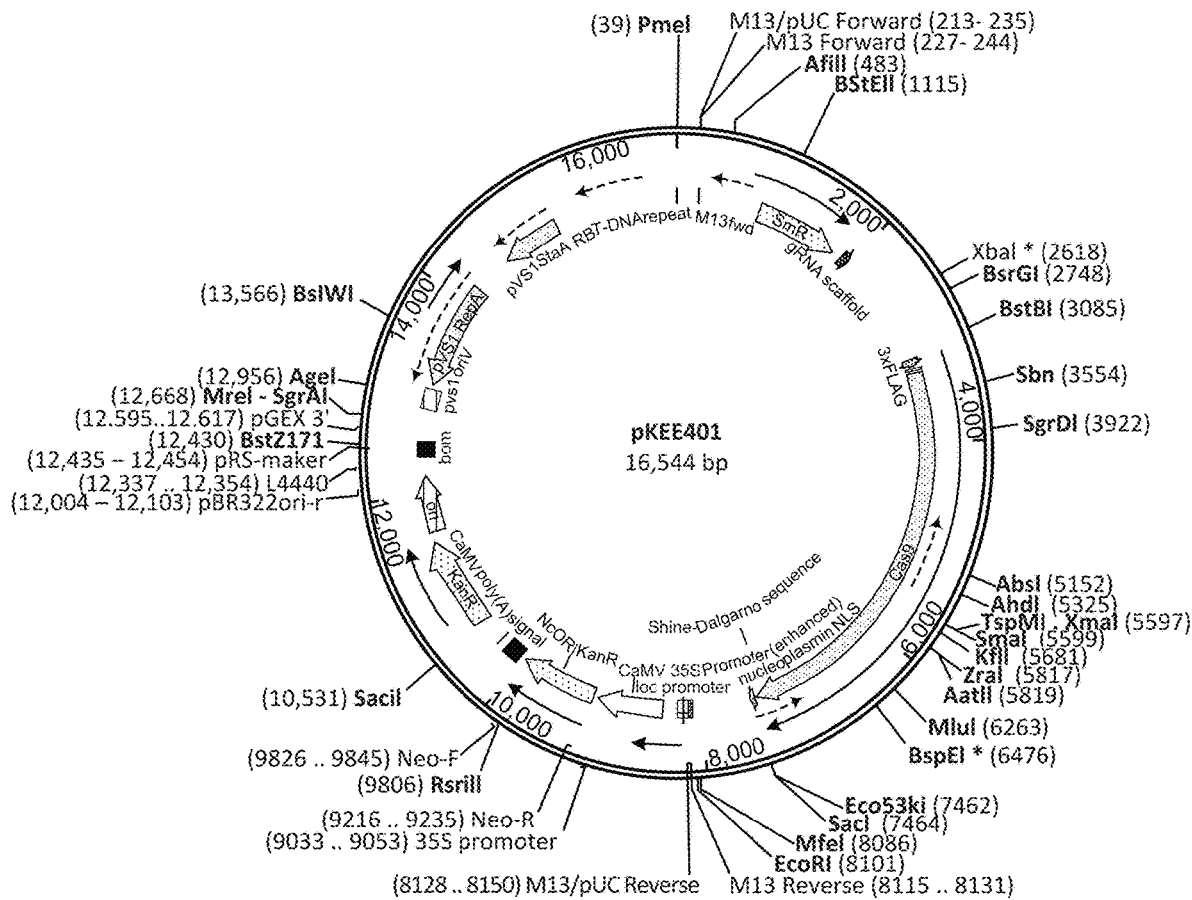
FIG. 8. Physical map of the pKEE401 binary vector used to produce plants disrupted in the PARP2 gene.

Methods. The CRISPR/Cas9 system was used to generate tomato plants carrying over a non-functional PARP2 gene. The cultivar used for genetic modification is the Micro-Tom cultivar. Seeds were obtained from Ballseed, Lot #2018230301. Targeting sites in the PARP gene were selected using the CRISPRdirect program available at https site crispr.dbcls.jp. The selected sgRNA target sequence was assembled in the T-DNA of plasmid pKEE401 (Wang et al., *Genome Biol.* 16:144, 2015; obtained from Addgene, depicted in FIG. 8; the vector has a pCambia backbone and contains the Cas9 gene, an empty gRNA scaffold, and the nptll gene for kanamycin resistance selection in bacteria and plants) containing a Cas9 endonuclease gene, codon-optimized for higher plants and driven by the CaMV 35S promoter, alongside the gRNA under the control of the U6 polymerase promoter, and the neomycin phosphotransferase (NPTII) selectable marker gene that confers kanamycin resistance (FIG. 5B). Construct assembly was performed using the Golden gate method (Weber et al. 2011). The CRISPR/Cas9-gRNA expression cassette was transformed into tomato using the *Agrobacterium*-mediated transformation protocol routinely used in our laboratory (Garcia et al., 2015).

In brief, cotyledons just emerged from the seed coat were dissected and pre-cultured for 2 days followed by inoculation with the *Agrobacterium tumefaciens* strain GV3101, containing the CRISPR/Cas9 constructs of interest. Following a 2-day co-cultivation, the cotyledon segments were transferred to a selective regeneration medium supplemented with 100 mg/l kanamycin, 250 mg/l cefotaxime and 500 mg/l carbenicillin. When shoots were 0.5 cm tall, they were transferred to a selective rooting medium that also contained 50 mg/l kanamycin and only the rooted plants were transferred to the greenhouse (Garcia et al., 2015).

Total RNA and genomic DNA was extracted using a standard cetyl-trimethyl-ammonium bromide protocol and RNeasy Plant Mini kit (QIAGEN). Each plant was genotyped for the presence of the Cas9-sgRNA construct with primers designed to amplify a region spanning the 3' end of the 35S promoter and the 5' end of Cas9. PARP2 gene expression analysis was also performed using RT-PCR. Amplicons were also generated with primers flanking the CRISPR/Cas9 target regions in the PARP2 gene. Primer sequences are presented in Table 1. All PCR products were resolved on 1% (w/v) agarose gel. Selected PCR products were excised and purified for cloning into the pSC-A-amp/kan vector (Strategene). A minimum of three clones per PCR product were sequenced using M13F and M13R primers. Alignments were performed using ClustalW in the MacVector software package. To test the germline transmission and heritability, seeds from T1 and T2 plants were germinated in vitro on selective medium containing 100 mg/l of kanamycin and DNA was extracted. Each seedling was genotyped by PCR for the presence of Cas9 and the inheritance of the mutations.

Figure 4:
FIG. 4. T1 mature wild-type tomato plant growing in soil.

Results. Transgenic tomato plants carrying over a disrupted PARP2 gene were generated using CRISPR-Cas9 system. The Cas9-sgRNA genes were transformed via *Agrobacterium*-mediated transformation. The presence of the transgenes was determined in the T0 primary transformants, as well as in the T1 and T2 generations of selected transformants using end-PCR and RT-PCR analyses (FIGS. 5A-B). Sequencing of the target region in the PARP2 gene indicated the presence of a single or a double nucleotide deletion, which would cause a translational frame-shift leading to the production of a truncated, non-functional protein. Plants carrying the mutation were notably smaller than the wild type, e.g., compare FIGS. 1 and 4. Additionally, plants with a mutation in the PARP2 gene flowered and fruited 10 days earlier than wild type (FIGS. 11A-B) and produced more seed per fruit than the wild type plants (FIG. 12F).

Figure 6A:
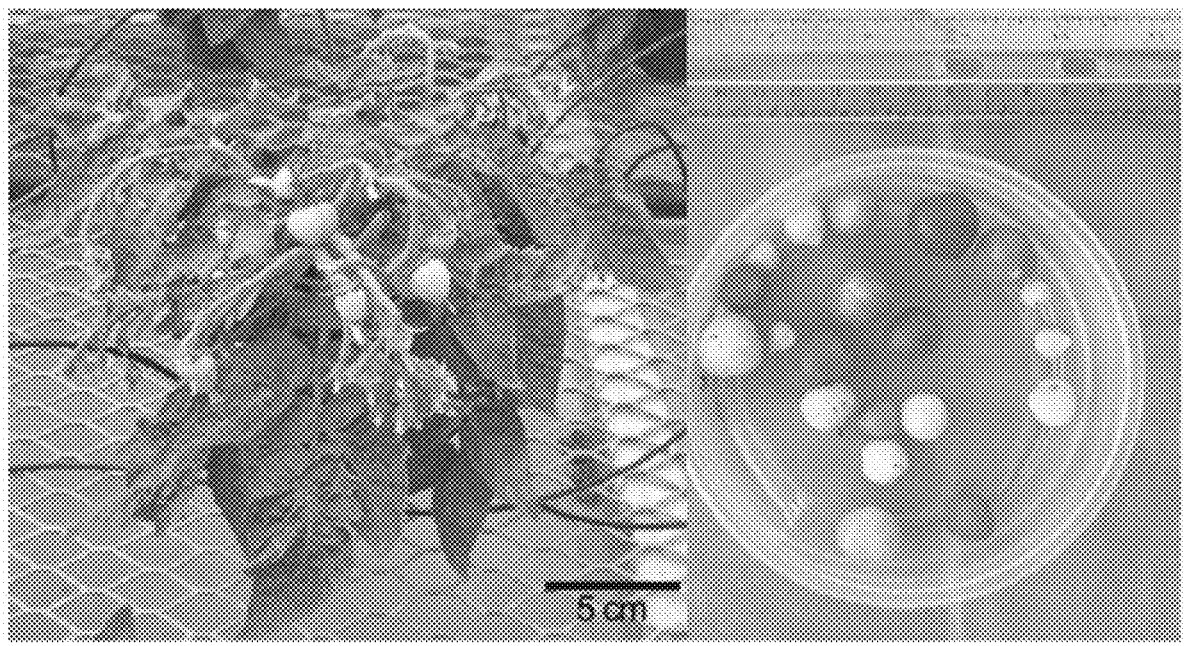
FIGS. 6A and 6B. 6A: T2 biomass and fruit production of a wild-type tomato plant (Harvest index=0.60); 6B: T2 biomass and fruit production of wild type (Harvest index=0.6) and plants disrupted in the PARP2 gene (Harvest index=0.77).
Figure 6B:
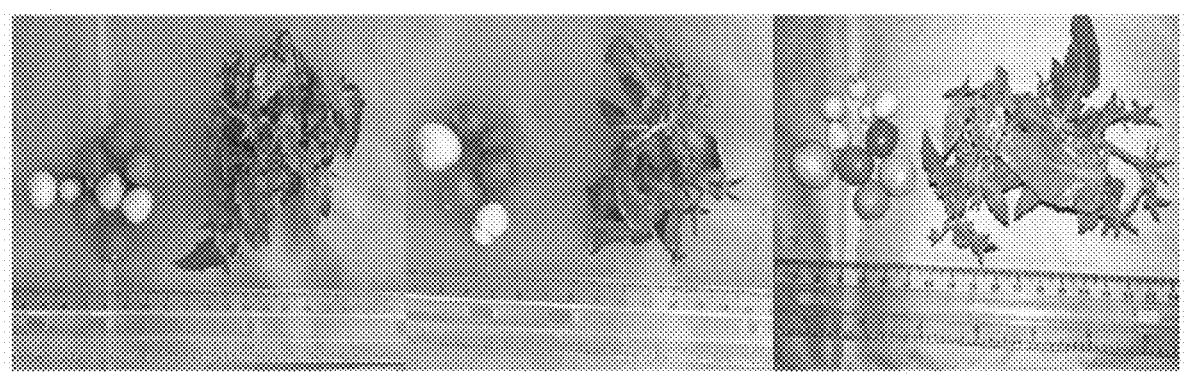

Harvest index is a plant productivity metric used to describe the relative distribution of biomass between the edible and inedible components of a crop (Hay, 1995). As illustrated in FIG. 6A-B, PARP mutants directed more biomass to fruit when compared to wild type plants. For T2 experiments, the average harvest index was 0.60 for wild type (FIGS. 6A and 11A) versus 0.77 (FIGS. 6B and 11B) for the plants carrying over the PARP2 disrupted gene.

Figure 2:
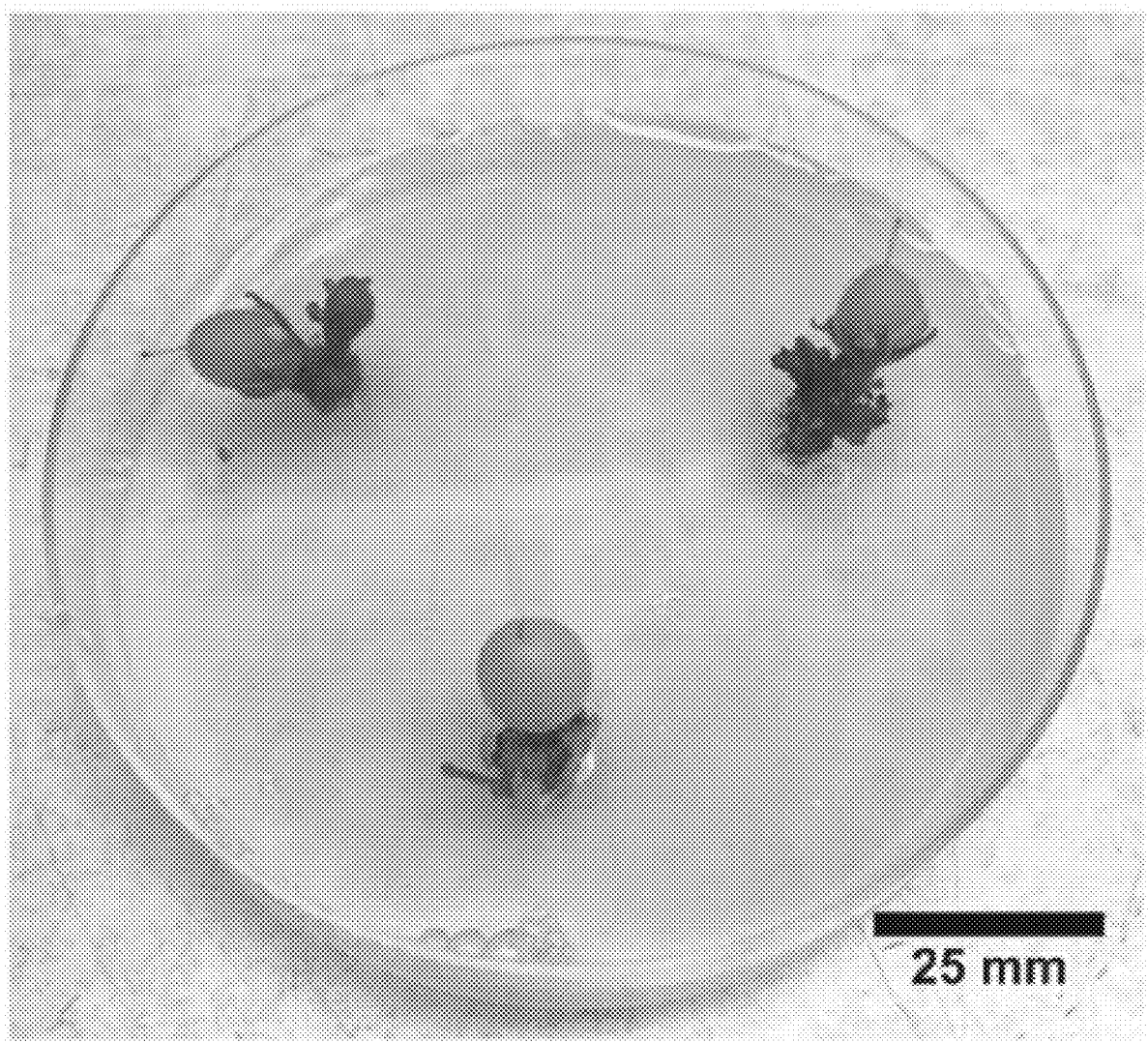
FIG. 2. Tomato plants disrupted in the PARP2 gene growing in vitro.
Figure 3:
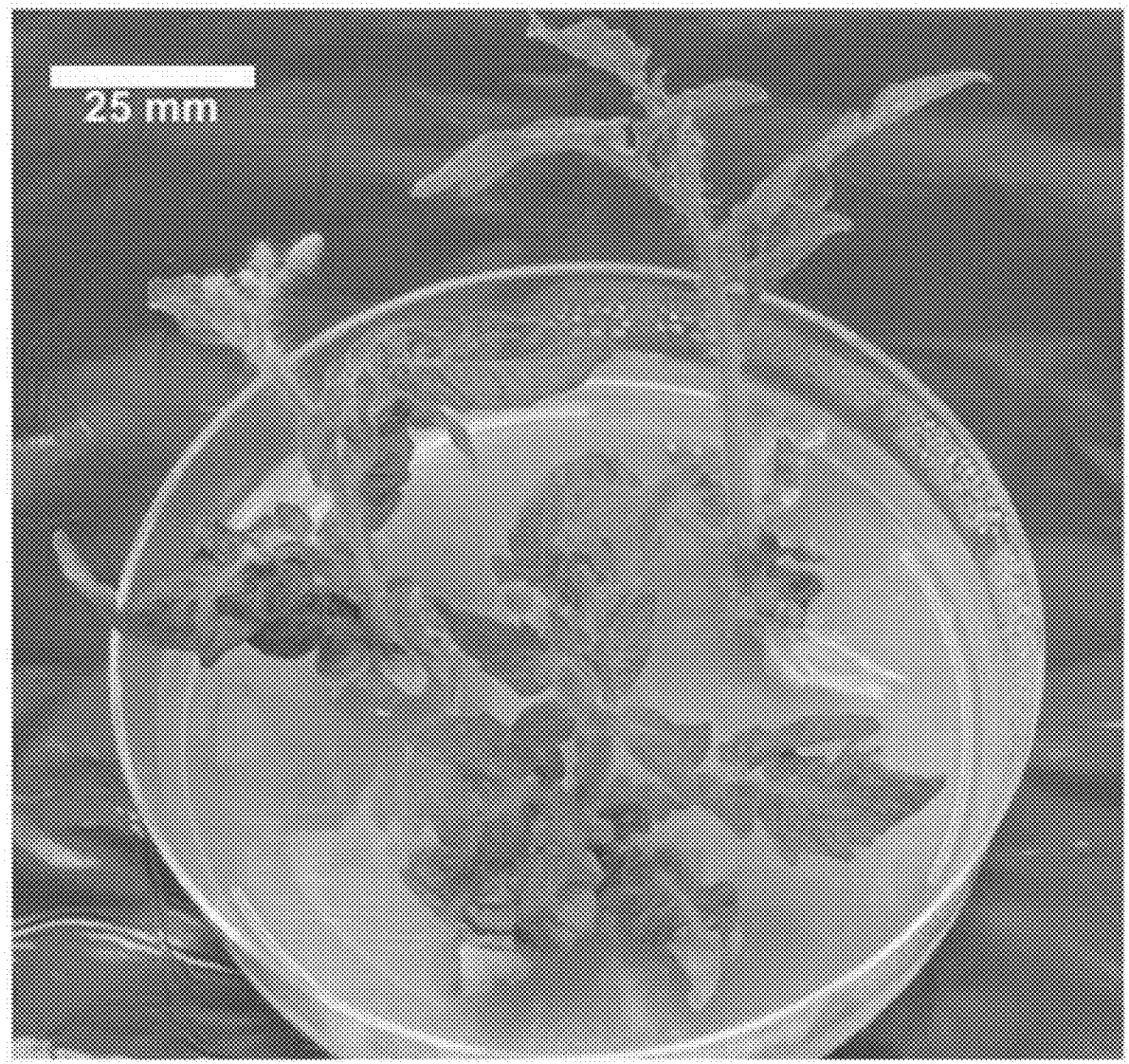
FIG. 3. Wild-type tomato plants growing in vitro.
Figure 10A:
FIG. 10A-10C. 10A: T2 population of tomato plants disrupted in the PARP2 gene during flowering and fruiting.
Figure 10B:
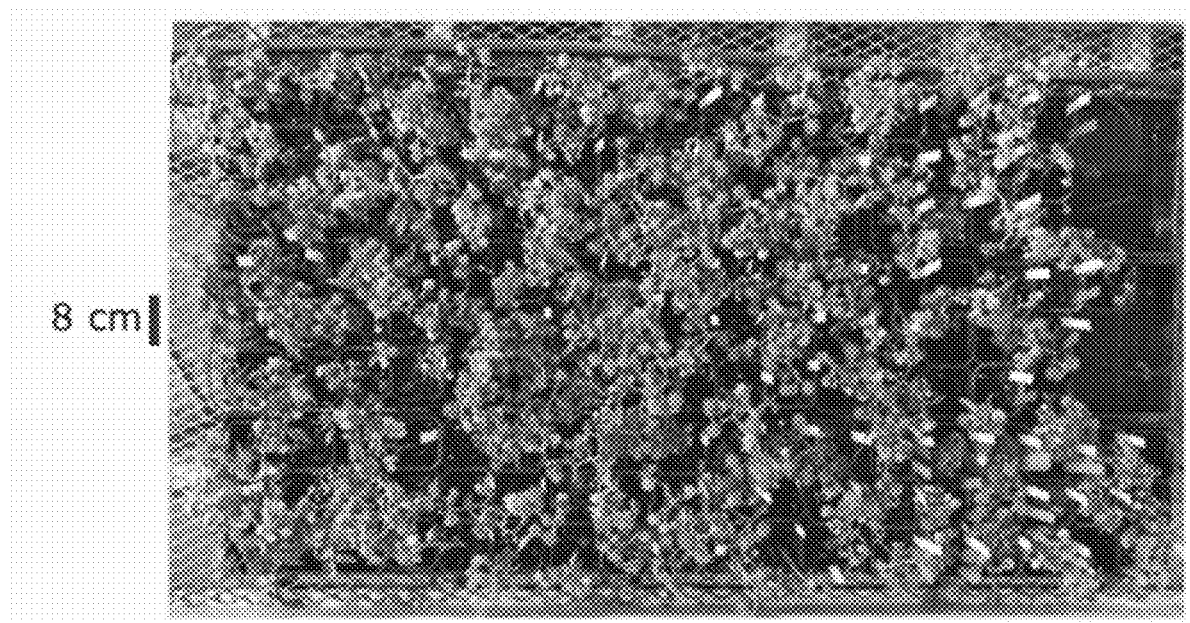
Figure 10C:
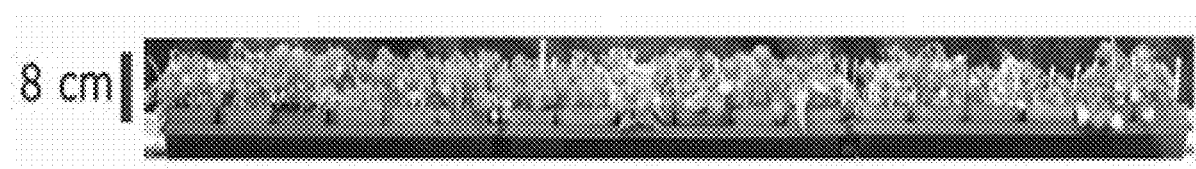
Figure 12A:
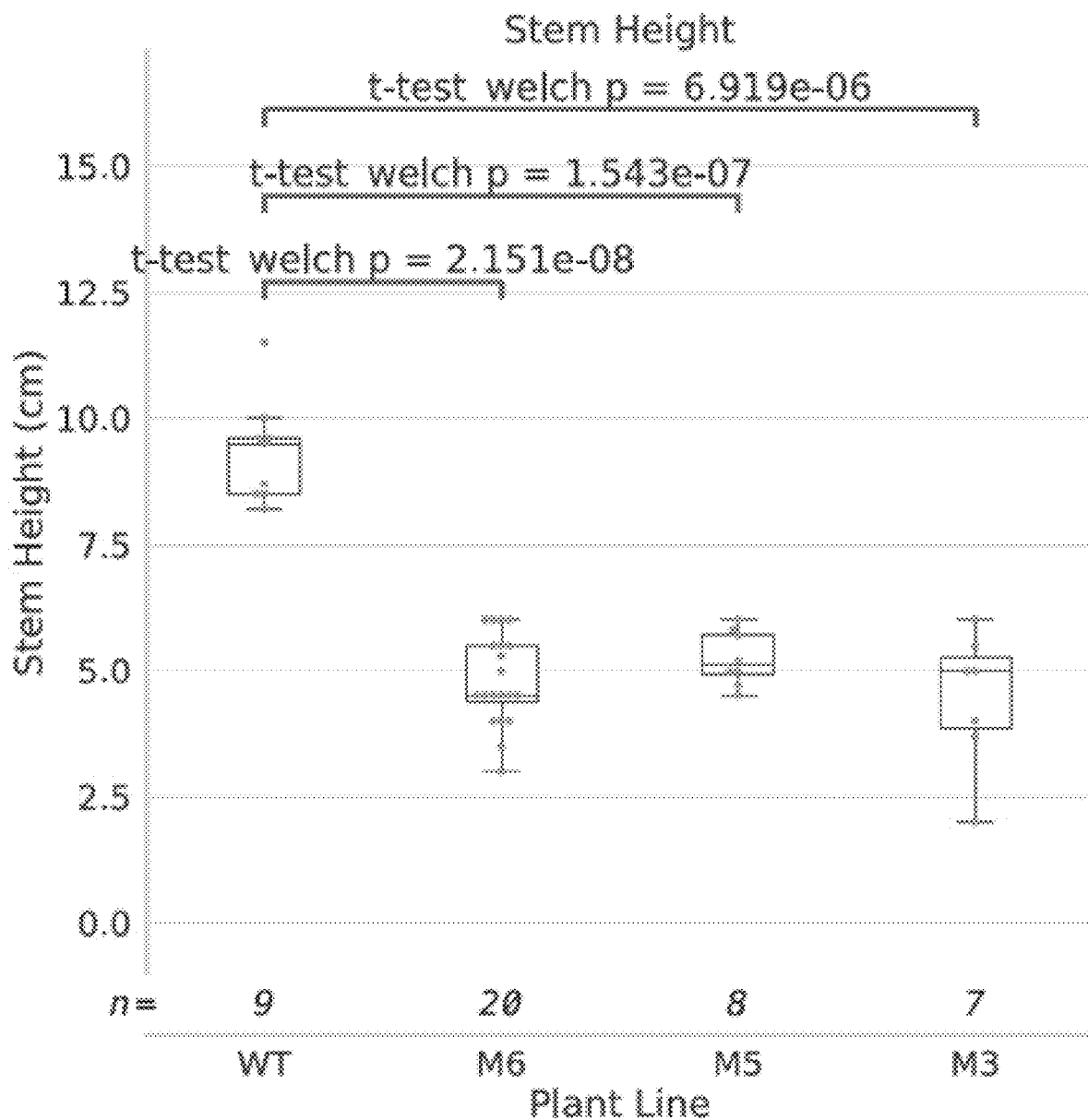
Figure 12B:
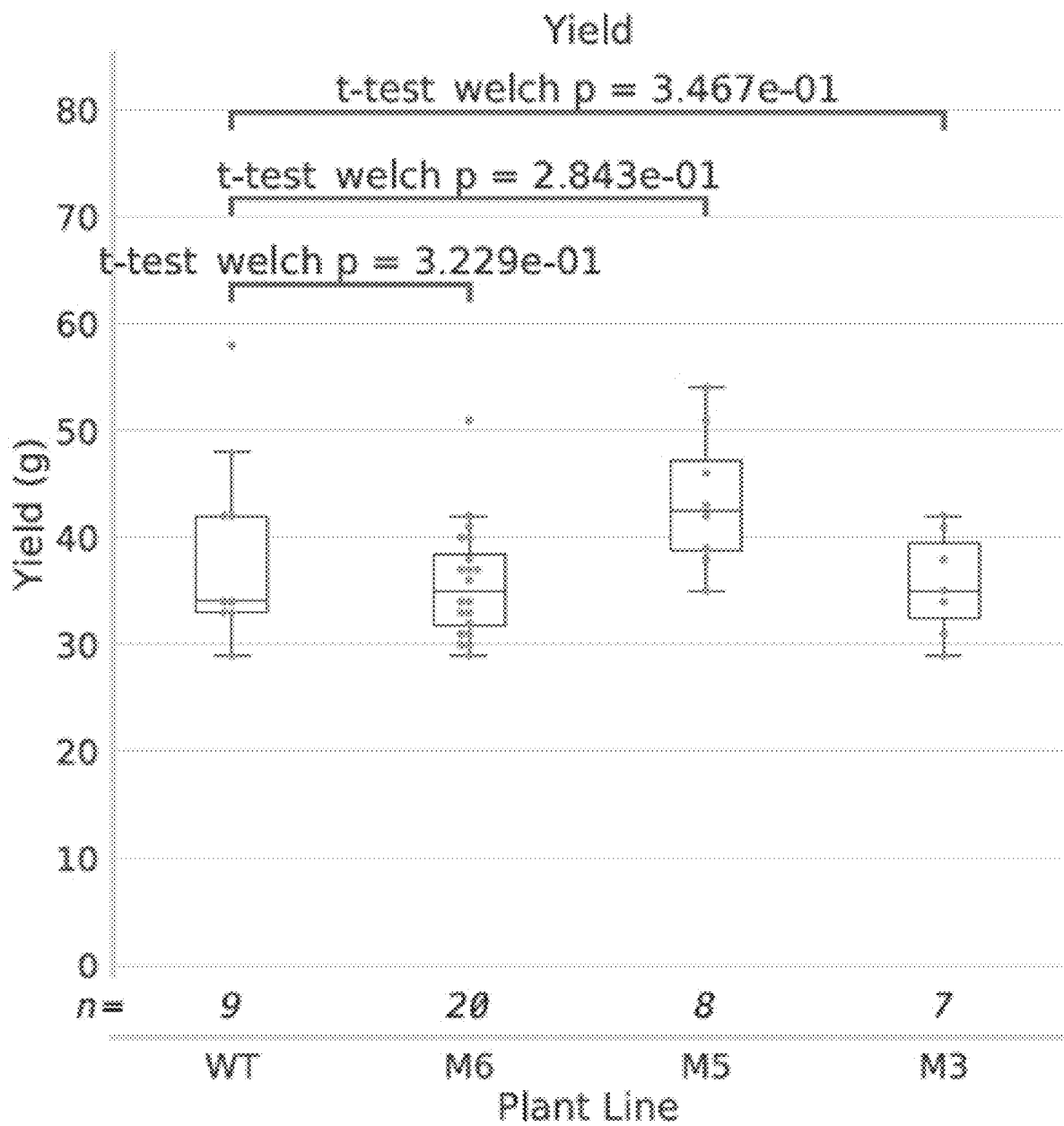
Figure 12C:
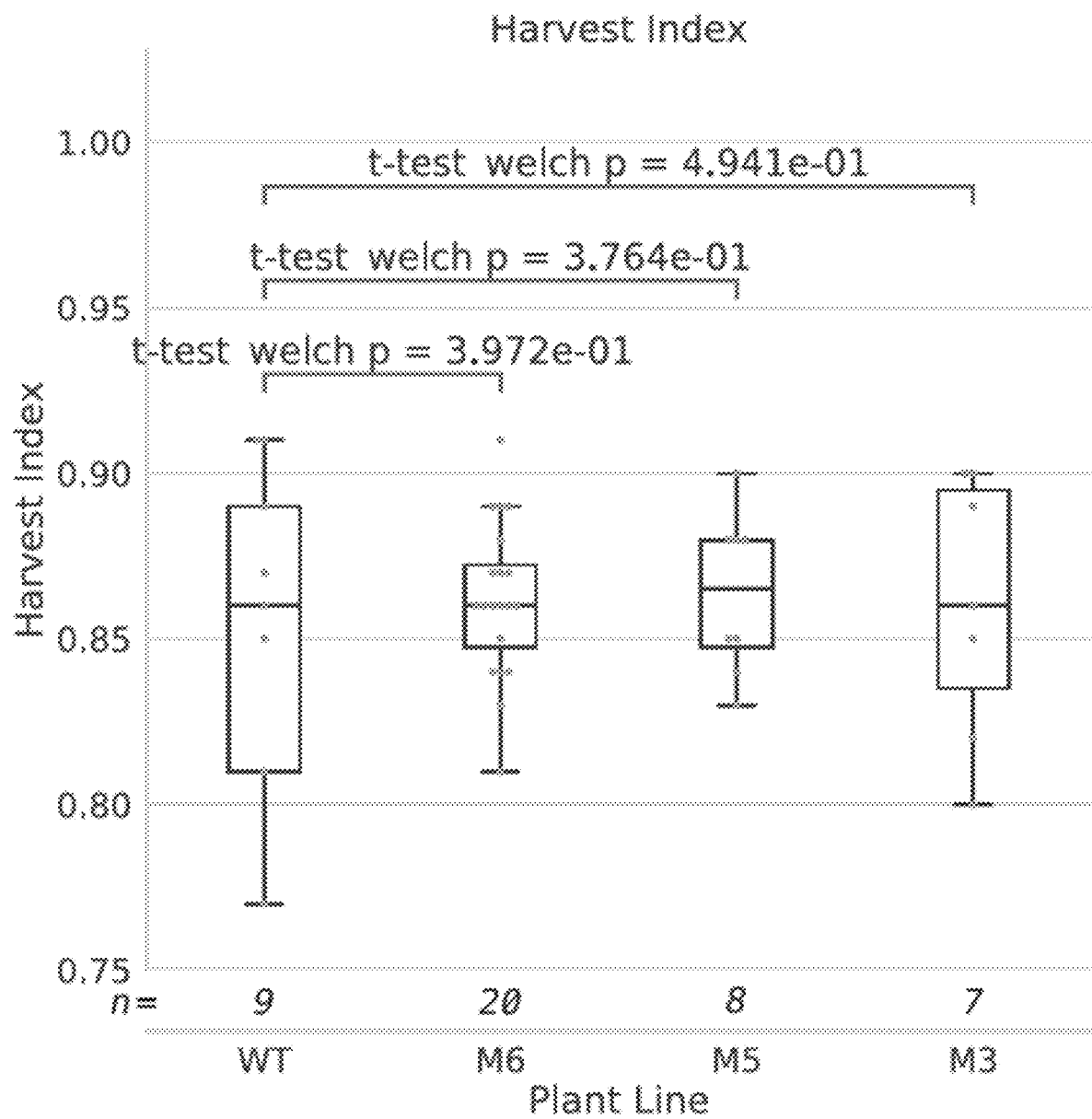
Figure 12D:
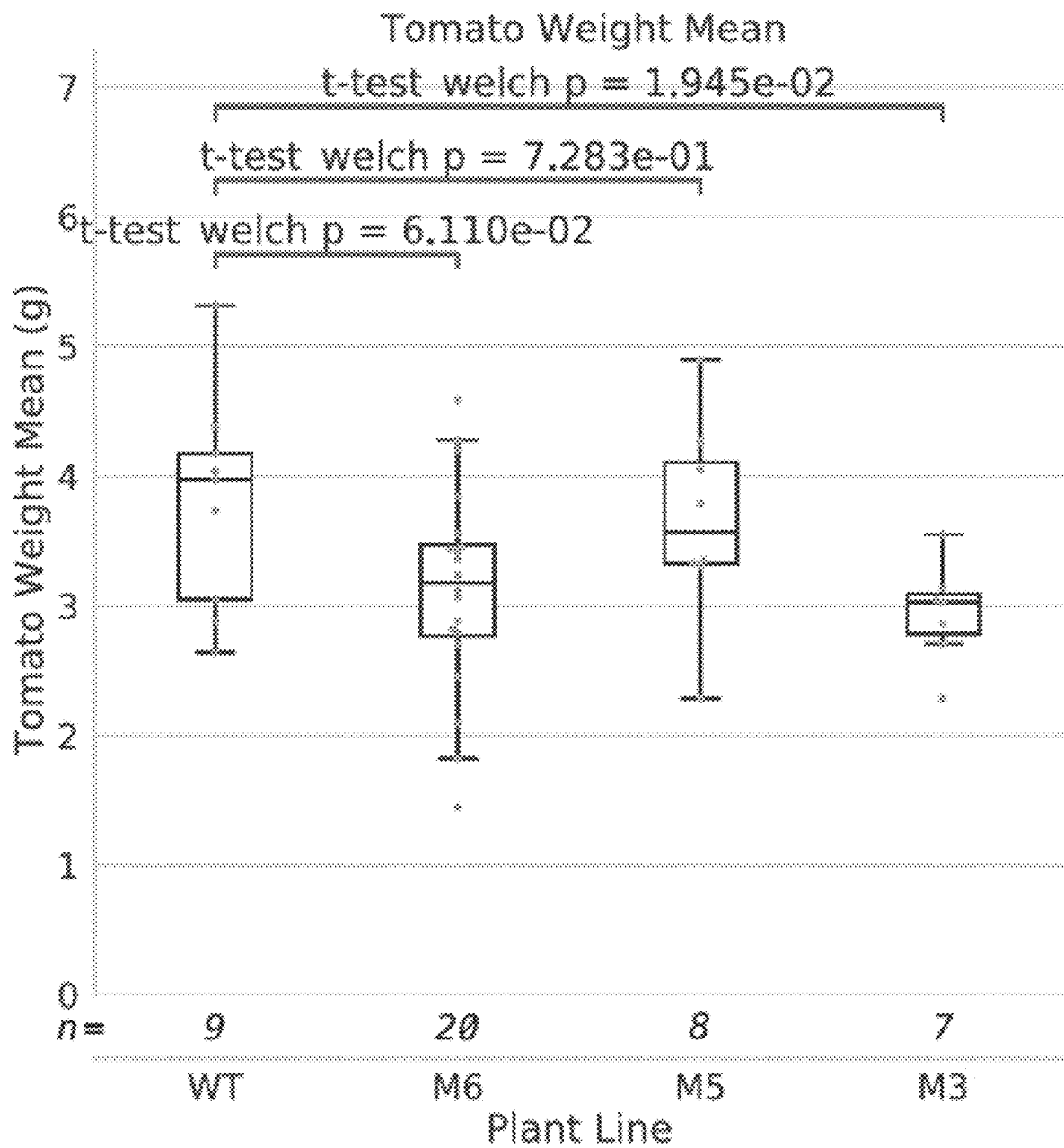
Figure 12E:
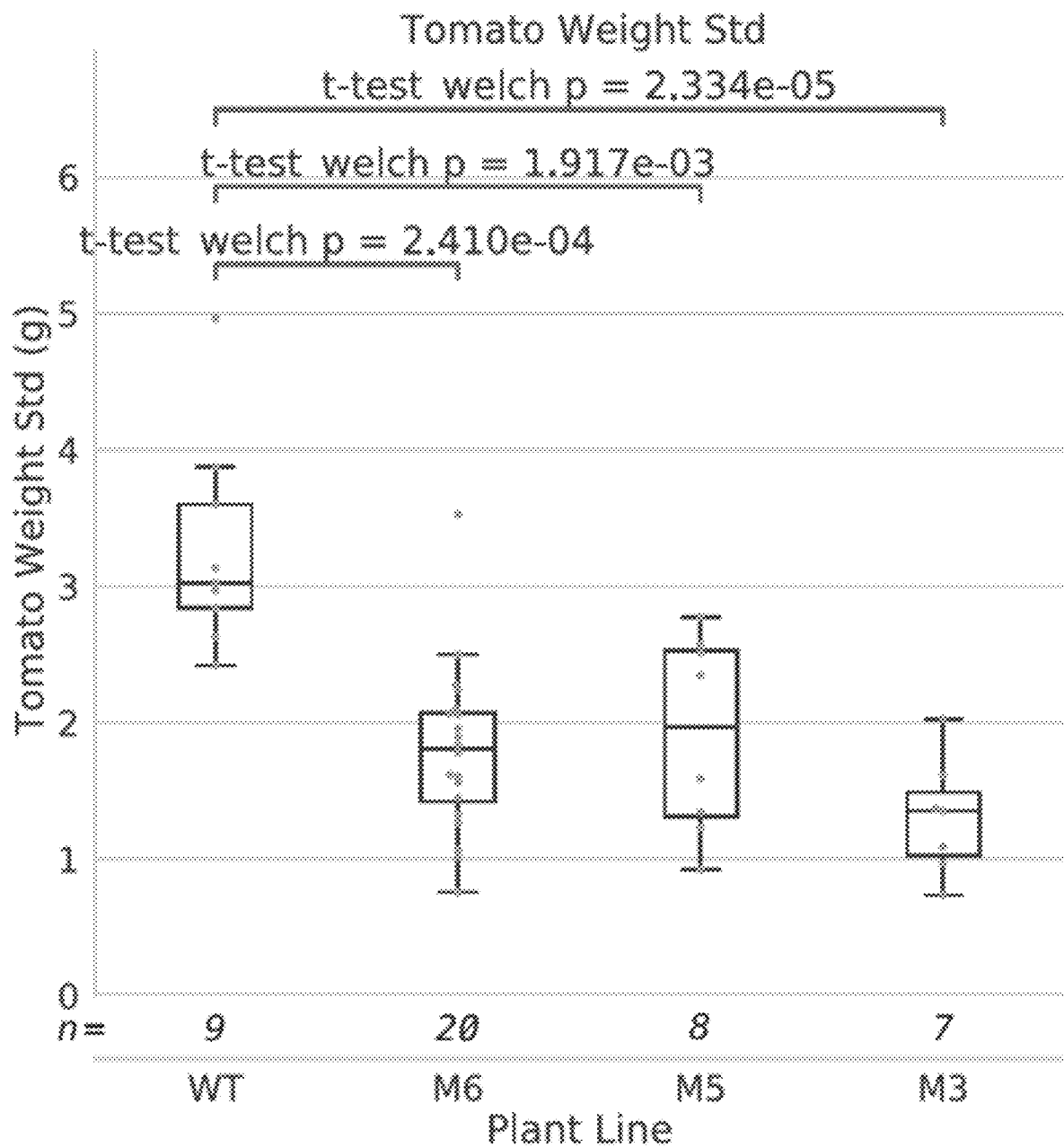
Figure 12F:
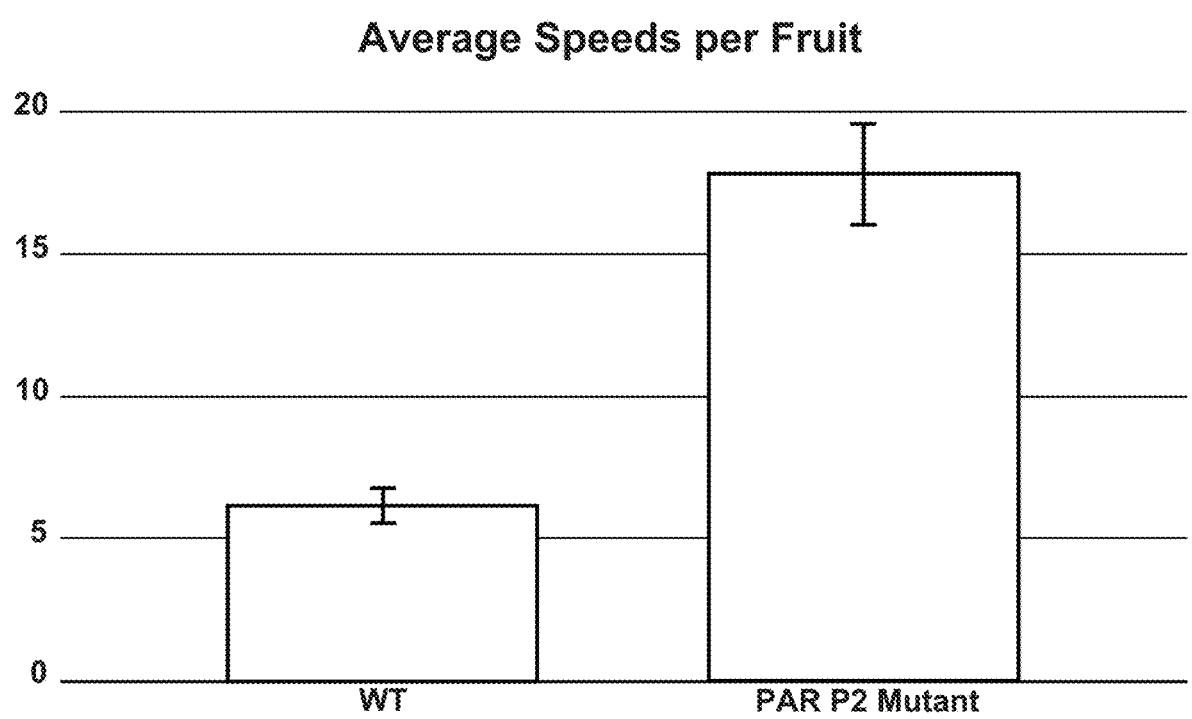

Stem height, i.e., primary stem height, was significantly shorter across all tomato plant lines disrupted in the PARP2 gene (FIGS. 11C and 12A). This trait allows for tomato plants disrupted in the PARP2 gene to better utilize vertical space (FIGS. 1, 10B-C, 11A-C, 12A) while producing the same or more yield of fruit when compared to wild type tomato plants (FIG. 12B), which is of particular value when growing crops via vertical farms utilizing shelves, e.g., one shelf (FIGS. 10B-C) and/or vertical grow towers populated with plants. An extreme example of efficient vertical and horizontal space utilization was demonstrated by explants disrupted in the PARP2 gene grown in vitro (FIGS. 2 and 14). Further, all tomato plant lines disrupted in the PARP2 gene had tomatoes significantly more consistent in size and that ripened faster, i.e., the standard deviation in tomato weight was smaller and the mean tomato weight was the same, when compared to those of wild type tomato plants (FIGS. 12D-E, 13). PARP mutants seem to be able to direct more resources to edible vs. inedible biomass, allowing for faster growth and maturity of their fruit, and a more homogenous size of their fruit. These traits are important because tomato growers are accustomed to having their first harvest be their most consumer-marketable one as subsequent harvests yield smaller fruit, which often has to be sold as a part of other less-income generating products, e.g., animal feed, sauces, etc.

In reference to FIG. 15, there were no statistically significant differences in taste features between wild type tomato plants and tomato plants with the SPACE traits.

In reference to FIG. 16, southern blot analysis reveals that the T-DNA insertion that contains a marker with a gene, e.g., the nptII gene, and the CRISPR/Cas9 system used to generate during transformation of plants that exhibit the SPACE traits, e.g., via gene editing using a CRISPR/Cas9 system, can be segregated out, e.g., by the T3 and T4 generations.

In reference to Table 1, nutritional analysis reveals that there is no significant difference between the nutritional properties between wild type tomato plants and tomato plants with the SPACE traits under various growing contexts.

Illustrative Sequences

*S. lycopersicum* PARP2 (Solyc08g074730) coding sequence (sequences for guide RNAs are underlined)
(SEQ ID NO: 1)

ATGGCCACCATTACCAATTTTAATGTCGATGAATTTGACTCAATGAATGT
TGTGGAGGAGTATAAGAAGATAAGTGTTAATGATCCGGTGAACTTTTATA
CTTGGTCGAAGAAAAAATTTGTTGACAGGCTTTGTGCTGTTGCTAATTTA
CAGATTGACGATCATCTACCAGTTGGAGATGAAGGCAAGACAGAGAAATT
GGTCACAGCAACAAAGAAGGGTGCAGCTGTTTTGGATCAATATCTGTCAG
ATGAAATCAAGGCATTATACCATGTCCTGCATCAAGGAAATGATATTTAT
GAGGCCACATTGAACCAAACAAATGTTGAGAACAACGATAACGAATTTTA
TATCATTCAAGTTCTAGAGAATGATTGTGGTGGGAATTTCCTTCTTTACA
CTAGATGGGGTAGAGTTGGTGAAAAGGGAGAAA<u>CGAAGATCAGTGGTCCC</u>
<u>TATACGTATGCCGGTGATGCC</u>ACATCTGAGTTTGAGCGTAAATTCTATGA
GAAGACCAAGAACTGTTGGTCTAACCGCAAAGATTTTTTTTGTCAACCAA
AGCAATATGCTTGGTTGGAAATGGACTATGATGAAAATGGGGAATACTCA
TCAATCCAAGGACAGTCCATTCTAGTACCAAGAAGTCGACCTCGTGAGAC
TAAGCTGGAGGCCCCGATTGCAAAGTTCATATCTCTTATTTGTGACATCA
ATATGATGAGGCAGCAAATGATGGAAATAGGTTACAATGCTAACAAGTTG
CCACTCGGTAAATTGAGCAAGAAAACTATTTTAAAGGGCTATGATGTCTT
GAAAAATATTGCTGTGTTATAGGCCAGTTCAACAGGACACTGCTTGAAGA
TTTGAGCAGTCAATTCTATACAGTCATTCCTCATGATTTTGGATTCCAGA
AGATGGAATTTGTCATTGACACCCTTCCAAAGTTAAAACGCAAATTGAA

TABLE 1

| Source: Eurofins Scientific Inc. | | | | |
|---|---|---|---|---|
| Nutritional Analysis | Wild Type | SPACE Tomatoes | | |
| Experiment (Context) | 1 (Greenhouse) | 1 (Greenhouse) | 4 (Greenhouse) | 3 (Growroom) |
| Calcium | 0.019% | 0.017% | 0.017% | 0.016% |
| Iron | 0.0003% | 0.0004% | 0.0008% | 0.0004% |
| Magnesium | 0.017% | 0.016% | 0.025% | 0.019% |
| Potassium | 0.260% | 0.217% | 0.383% | 0.284% |
| Zinc | 2.6 ppm | 2.7 ppm | 3.3 ppm | 3.5 ppm |
| β-carotene | 731 IU/100 g | 580 IU/100 g | 664 IU/100 g | 747 IU/100 g |
| Retinol | <60 IU/100 g | <60 IU/100 g | <60 IU/100 g | <60 IU/100 g |
| Total Vitamin A | 731 IU/100 g | 580 IU/100 g | 664 IU/100 g | 747 IU/100 g |
| Vitamin C | 20.3 mg/100 g | 18.7 mg/100 g | 16.9 mg/100 g | 16.8 mg/100 g |
| Lycopene | 12.4 µg/g | 16.1 µg/g | 30.4 µg/g | 25.8 µg/g |
| Moisture | N/A | N/A | 91.7% | 91.9% |

All references, including publications, accession numbers, patent applications, and patents, cited herein are hereby incorporated by reference for the purpose for which it is cited to the same extent as if each reference were individually and specifically indicated to be incorporated by reference.

-continued

ATGGTGAAAGCTCTTGCTGAAATTGAAGTCACAACTAAGTTATCGGAGGA
TAACACAGATATACAGGAGGATCCCTTGTTTTATCAATATGAACAACTTG
GTTGCAAACTTGTTCCAGTTGAAGTCGGTTCCCAGGAATATCTCATGATT
GAGAATTACATGAAGAATACCCATGCAAAATACATTCTGGTTATGCTGTC
GATATTGTTCAAGTATTTAGGGCATCAAGAAATGGTGAAAATGAAAGATT

TCAGAAGTTCTCTGATACGAGTAATAGGATGCTTTTATGGCACGGTTCTC

GGCTGACAAACTGGGCTGGCATTCTTTCACAGGGTTTAAGAATTGCTCCT

CCAGAAGCACCTTCGACAGGGTACATGTTTGGGAAAGGTGTTTACTTTGC

TGATATGTTCTCCGAGAGTGCAATTTATTGCTATGCCTCATCGGCTGCTA

AGAATGGTGTGCTTTTGTTGTGCGAGGTTGCTCTCGGCGACATGAATGAG

CTATTGTCAGCCAACTCCGATGCTGATAAGTTGCCTTTGGGAAAGCTAAG

CACAAAAGCAGTCGGTGCCATGGCCCCAGATTTTAAAGAAGCTCAAATAC

TTGAAGATGGTGTCATCGTTCCTCTGGGAAATCCAAAGGAGCGACCAAAA

CAGGGTAATTTGTTGCATAATGAGTACATTGTTTACAATGTGGAACAATT

AAGGATGCGCTATGTTATCCAGGTTGAGTTCAATTATGAAATA pHEE401E PARP2 (with one sg RNAs underlined)
(SEQ ID NO: 2)
CGACTTGCCTTCCGCACAATACATCATTTCTTCTTAGCTTTTTTTCTTCT

TCTTCGTTCATACAGTTTTTTTTTGTTTATCAGCTTACATTTTCTTGAAC

CGTAGCTTTCGTTTTCTTCTTTTTAACTTTCCATTCGGAGTTTTTGTATC

TTGTTTCATAGTTTGTCCCAGGATTAGAATGATTAGGCATCGAACCTTCA

AGAATTTGATTGAATAAAACATCTTCATTCTTAAGATATGAAGATAATCT

TCAAAAGGCCCCTGGGAATCTGAAAGAAGAGAAGCAGGCCCATTTATATG

GGAAAGAACAATAGTATTTCTTATATAGGCCCATTTAAGTTGAAAACAAT

CTTCAAAAGTCCCACATCGCTTAGATAAGAAAACGAAGCTGAGTTTATAT

ACAGCTAGAGTCGAAGTAGTGATTGATACGTATGCCGGTGATGCCTTTTA

GAGCTAGAAATAGCAAGTTAAAATAAGGCTAGTCCGTTATCAACTTGAAA

AAGTGGCACCGAGTCGGTGCTTTTTTTTGCAAAATTTTCCAGATCGATTT

CTTCTTCCTCTGTTCTTCGGCGTTCAATTTCTGGGGTTTTCTCTTCGTTT

TCTGTAACTGAAACCTAAAATTTGACCTAAAAAAAATCTCAAATAATATG

ATTCAGTGGTTTTGTACTTTTCAGTTAGTTGAGTTTTGCAGTTCCGATGA

GATAAACCAATATTAATCCAAACTACTGCAGCCTGACAGACAAATGAGGA

TGCAAACAATTTTAAAGTTTATCTAACGCTAGCTGTTTTGTTTCTTCTCT

CTGGTGCACCAACGACGGCGTTTTCTCAATCATAAAGAGGCTTGTTTTAC

TTAAGGCCAATAATGTTGATGGATCGAAAGAAGAGGGCTTTTAATAAACG

AGCCCGTTTAAGCTGTAAACGATGTCAAAAACATCCCACATCGTTCAGTT

GAAAATAGAAGCTCTGTTTATATATTGGTAGAGTCGACTAAGAGATTGAG

AAGTCGACCTCGTGAGACGTTTTAGAGCTAGAAATAGCAAGTTAAAATAA

GGCTAGTCCGTTATCAACTTGAAAAAGTGGCACCGAGTCGGTGCTTTTTT

TTGCAAAATTTTCCAGATCGATTTCTTCTTCCTCTGTTCTTCGGCGTTCA

ATTTCTGGGGTTTTCTCTTCGTTTTCTGTAACTGAAACCTAAAATTTGAC

CTAAAAAAATCTCAAATAATATGATTCAGTGGTTTTGTACTTTTCAGTT

AGTTGAGTTTTGCAGTTCCGATGAGATAAACCAATA

---

What is claimed is:

1. A method of obtaining a tomato plant that has reduced non-edible biomass compared to a counterpart control tomato plant, the method comprising disrupting expression of an endogenous Poly(adenosine 5'-diphosphate (ADP)-ribose) polymerase (PARP) gene of the tomato plant, wherein the endogenous PARP gene is a *S. lycopersicum* Solyc08g074730 PARP2 gene that encodes the coding sequence set forth in SEQ ID NO: 1;
    selecting a tomato plant that has a reduction in the proportion of non-edible biomass compared to the counterpart control tomato plant; and
    wherein the step of disrupting expression of the PARP gene comprises introducing an RNA-guided nuclease into the plant wherein at least one guide RNA targets the PARP gene.

2. The method of claim 1, wherein the RNA-guided nuclease is a Cas polypeptide.

3. The method of claim 2, wherein the RNA-guided nuclease is a Cas9 polypeptide.

4. A plant obtained by the method of claim 1 or a progeny thereof that has disrupted expression of the endogenous PARP gene.

* * * * *